United States Patent
Kimoto et al.

(10) Patent No.: US 7,782,497 B2
(45) Date of Patent: Aug. 24, 2010

(54) IMAGE FORMING APPARATUS THAT DISPLAYS ICONS IN A SELECTABLE STATE ACCORDING TO DRAFT SETTING DIRECTION

(75) Inventors: Yuko Kimoto, Yokohama (JP); Naoki Hoshino, Ageo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1120 days.

(21) Appl. No.: 11/373,012

(22) Filed: Mar. 9, 2006

(65) Prior Publication Data

US 2007/0211262 A1    Sep. 13, 2007

(51) Int. Cl.
*H04N 1/40* (2006.01)

(52) U.S. Cl. .................. 358/448; 358/449; 358/452; 358/453; 715/810; 715/763; 715/846; 715/967; 715/835

(58) Field of Classification Search ........... 358/1.1–1.9, 358/444–474; 715/810, 763, 835–837, 846, 715/967, 976, 977
See application file for complete search history.

(56) References Cited

U.S. PATENT DOCUMENTS

| | | | | |
|---|---|---|---|---|
| 5,301,036 A | * | 4/1994 | Barrett et al. | 358/448 |
| 5,461,459 A | * | 10/1995 | Muramatsu et al. | 399/15 |
| 6,178,005 B1 | * | 1/2001 | Yoshida | 358/1.18 |
| 6,285,842 B1 | * | 9/2001 | Katamoto et al. | 399/81 |
| 6,295,136 B1 | * | 9/2001 | Ono et al. | 358/1.15 |
| 6,304,681 B1 | * | 10/2001 | Akiba et al. | 382/297 |
| 6,567,627 B2 | * | 5/2003 | Maeda et al. | 399/81 |
| 2003/0058284 A1 | * | 3/2003 | Toh et al. | 345/810 |
| 2005/0235196 A1 | * | 10/2005 | Iwanaga et al. | 715/500 |
| 2006/0238789 A1 | * | 10/2006 | Pesar | 358/1.13 |

OTHER PUBLICATIONS

Hoshino, Naoki, Pending U.S. Appl. No. 11/373,645, filed Mar. 9, 2006.
Kimoto, Yuko, Pending U.S. Appl. No. 11/373,000, filed Mar. 9, 2006.
Hoshino, Naoki, Pending U.S. Appl. No. 11/373,403, filed Mar. 9, 2006.
Hoshino, Naoki, Pending U.S. Appl. No. 11/373,011, filed Mar. 9, 2006.
Kimoto, Yuko, Pending U.S. Appl. No. 11/373,799, filed Mar. 9, 2006.
Hoshino, Naoki, Pending U.S. Appl. No. 11/373,013, filed Mar. 9, 2006.
Hoshino, Naoki, Pending U.S. Appl. No. 11/373,395, filed Mar. 9, 2006.

* cited by examiner

*Primary Examiner*—Benny Q Tieu
*Assistant Examiner*—Quyen Ngo
(74) *Attorney, Agent, or Firm*—Patterson & Sheridan, LLP

(57) ABSTRACT

A draft size detecting function detects a size and a setting direction of a draft set in a scanner which reads an image of the draft, a display unit displays, in a selectable state, an icon corresponding to the draft setting direction detected by the draft size detecting function, and displays, in a non-selectable state, an icon which does not correspond to the draft setting direction detected by the detecting function among a plurality of icons to designate a direction of the image in the draft, and the image direction corresponding to the selected icon is set as the direction of the image in the draft, in a case where the specific icon is selected from the selectable icons displayed in the display unit.

18 Claims, 14 Drawing Sheets

IMAGE FORMING APPARATUS THAT DISPLAYS ICONS IN A SELECTABLE STATE ACCORDING TO DRAFT SETTING DIRECTION

BACKGROUND OF THE INVENTION

1. Field of the Invention

The present invention relates to an operation device for a user to set photocopy processing, and an image forming apparatus which performs photocopy processing based on user's designated setting of the photocopy processing.

2. Description of the Related Art

Heretofore, an image forming apparatus such as a photocopier is provided with an operation panel to perform various settings. However, in the conventional operation panel, an operation for setting predetermined photocopy processing is complicated or is not easy to understand. Therefore, in the image forming apparatus provided with the operation panel, it is difficult to set the desired photocopy processing, and a result of the photocopy processing becomes different from that intended by a user in many cases.

Moreover, a draft to be photocopied has two image directions (portrait and landscape). The portrait (longitudinal image) has such an image direction that a print line is parallel to a short side of a draft sheet. The landscape (lateral image) has such an image direction that a print line is parallel to a long side of the draft sheet. Especially in a case where a photocopy result (finish) is largely influenced by the direction of the image in the draft, it is preferable that user's intended image direction can easily and securely be set. However, a conventional photocopier or an operation device for use in the photocopier has a problem that it is difficult for the user to securely designate the direction of the image in the draft.

BRIEF SUMMARY OF THE INVENTION

In an aspect of the present invention, an object is to provide an operation device and an image forming apparatus in which operability in setting photocopy processing has been improved.

An image forming apparatus of one aspect of the present invention has: a scanner which reads an image of a draft; a printer which prints the image on an image forming medium; a detection unit which detects a size and a setting direction of the draft set in the scanner; a display unit which displays a plurality of icons to set the direction of the image in the draft and which displays, in a selectable state, an icon corresponding to the draft setting direction detected by the detection unit among the icons and which displays, in a non-selectable state, an icon that does not correspond to the draft setting direction detected by the detection unit among the icons; and a setting unit which sets the direction of the image in the draft to the image direction corresponding to the selected icon, in a case where the specific icon is selected from the selectable icons displayed in the display unit.

In another aspect of the present invention, an image forming apparatus has: a scanner which reads an image of a draft; a printer which prints the image on an image forming medium; a display unit which displays various setting screens concerning photocopy processing to print, on an image forming medium by the printer, the draft image read by the scanner; an operation unit which inputs setting information on the photocopy processing; a setting unit which sets the photocopy processing in accordance with contents input by the operation unit; a draft graphical image setting unit which sets a draft graphical image based on set contents concerning the draft set by the setting unit; a finished graphical image setting unit which sets a finished graphical image based on set contents concerning a finish set by the setting unit; a display control unit which displays, in the setting screens concerning the photocopy processing, the draft graphical image set by the draft graphical image setting unit and the finished graphical image set by the finished graphical image setting unit; and a judgment unit which judges whether or not the direction of the image in the draft is to be displayed in accordance with contents input by the operation unit, wherein the draft graphical image setting unit sets the draft graphical image in which a graphical image indicating the draft is synthesized with a mark indicating the direction of the image in the draft, in a case where the judgment unit judges that the image direction is to be displayed, and the finished graphical image setting unit sets the finished graphical image in which a graphical image indicating the image forming medium is synthesized with a mark indicating a direction of an image to be printed on the image forming medium, in a case where the judgment unit judges that the image direction is to be displayed.

In still another aspect of the present invention, an image forming apparatus has: a scanner which reads an image of a draft; a printer which prints the image on an image forming medium; a display unit which displays a setting screen of photocopy processing to print, on the image forming medium by the printer, the draft image read by the scanner; an operation unit which inputs setting information on the photocopy processing in a state in which the setting screen of the photocopy processing is displayed in the display unit; a memory which stores default setting information on the photocopy processing, including at least default setting information on a direction of the image in the draft; a setting unit which sets the photocopy processing in accordance with the default setting information stored in the memory and contents input by the operation unit; and a default update unit which updates a default image direction stored in the memory in accordance with a setting frequency of the direction of the image in the draft with respect to the photocopy processing executed based on set contents set by the setting unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will be described hereinafter with reference to the drawings.

Figure 1:
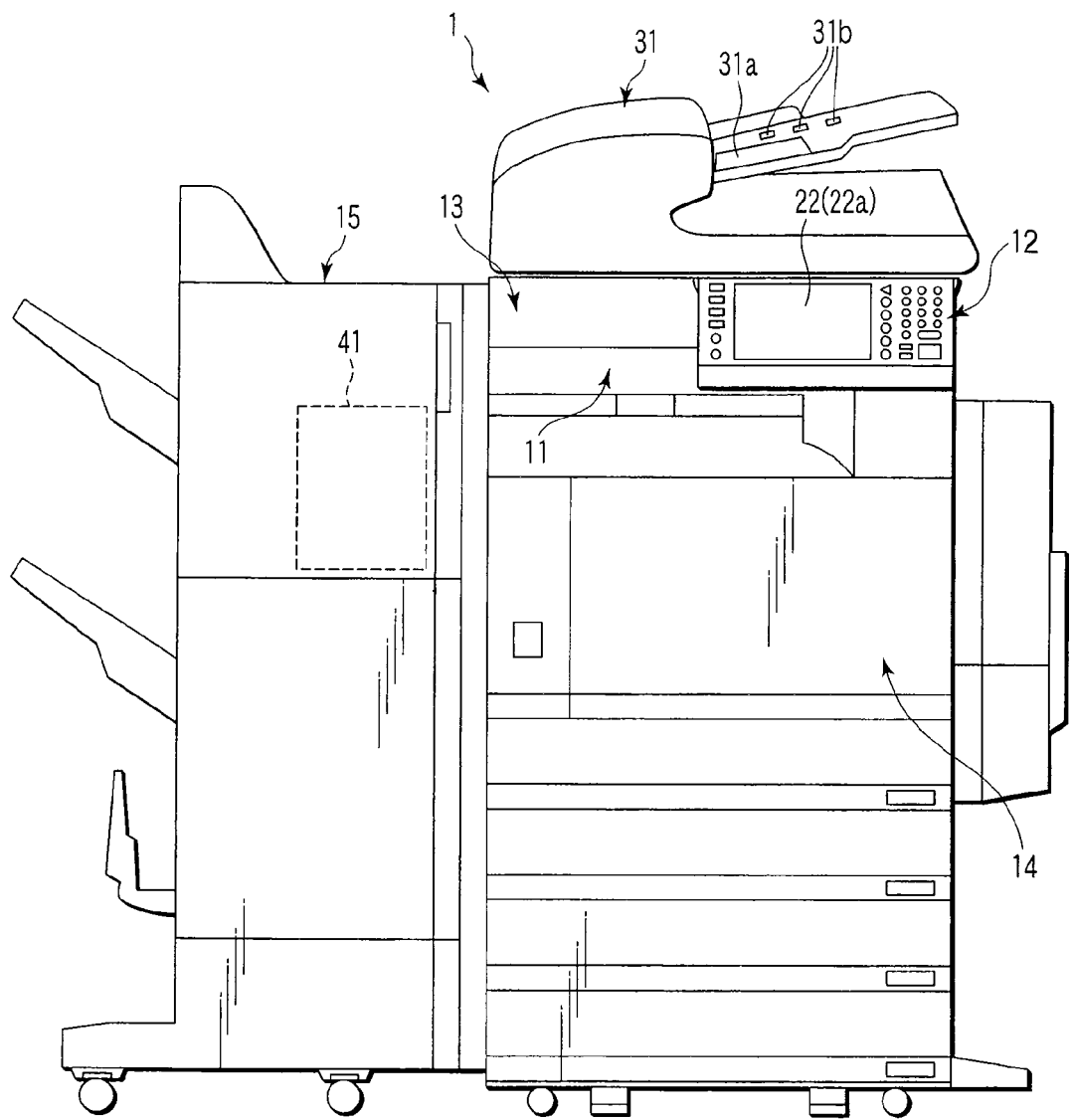
FIG. 1 is a diagram showing an appearance constitution of a digital multifunction peripherals 1 as an image forming apparatus in an embodiment of the present invention.

FIG. 1 is a diagram showing an appearance constitution of a digital multifunction peripherals 1 as an image forming apparatus in the embodiment of the present invention.

As shown in FIG. 1, this digital multifunction peripherals 1 is constituted of a system control unit 11, an operation panel 12, a scanner unit 13, a printer unit 14, a finisher unit 15 and the like.

The system control unit 11 controls the whole digital multifunction peripherals 1. The system control unit 11 is disposed in a main body of the digital multifunction peripherals 1. The system control unit 11 is connected to the operation panel 12, the scanner unit 13, the printer unit 14, the finisher unit 15 and the like. Accordingly, the system control unit 11 performs various controls with respect to the respective units.

The operation panel 12 is disposed on a front surface of the digital multifunction peripherals main body. The operation panel 12 is a user interface. An operation surface of the operation panel 12 is provided with hardware keys 21 as an operating section, a display section 22 in which a touch panel 22a is built and the like.

The scanner unit 13 functions as an image reading unit which reads an image of a draft. The scanner unit 13 is disposed in an upper part of the digital multifunction peripherals main body. The scanner unit 13 main body is constituted of: a scanning section (not shown) which optically scans a draft surface; a photoelectric converting section (not shown) such as a CCD line sensor which converts, into an electric signal, light reflected by the draft surface optically scanned by the scanning section and the like.

Moreover, the scanner unit 13 has an auto document feeder (ADF) 31. The ADF 31 conveys the surface of the draft to be read to an image reading position of the scanner unit 13 main body. That is, the image of the draft conveyed by the ADF 31 is read by the scanner unit 13 main body. The ADF 31 has: a draft table on which the draft is to be set; a conveying mechanism which conveys the drafts set on the draft table one by one; and a draft discharge section to which the draft conveyed by the conveying mechanism is discharged. The draft table of the ADF 31 is provided with a guide section 31a which guides the conveyed drafts and a plurality of sensors 31b for detecting a size of the draft. The guide section 31a and each sensor 31b function as a detector for detecting the size of the draft on the draft table.

The printer unit 14 forms an image on a sheet (photocopy sheet) as an image forming medium. The printer unit 14 is constituted of, for example, a conveying section which conveys the sheet, an image forming section which forms an image on the sheet conveyed by the conveying section and the like.

The finisher unit 15 performs various types of finish processing with respect to the sheet as the image forming medium printed by the printer unit 14. The finisher unit 15 has finishing functions such as: a stapling function of stapling together a plurality of sheets printed by the printer unit 14; a sorting function of sorting the sheets printed by the printer unit 14 based on a set sorting method; and a stacking function of discharging the sheet printed by the printer unit 14 based on a set sheet discharging order or a set sheet discharging method. The finisher unit 15 has finishing functions realized by a control similar to that of the stapling function, such as: a hole punching function of making a hole in a predetermined position in the sheet printed by the printer unit 14; and a saddle stitching function of folding back a plurality of sheets printed by the printer unit 14 along the center line of each sheet to staple together the sheets.

The finisher unit 15 has a stapler 41 or the like as a mechanism for performing the stapling function. For example, the stapler 41 staples together the plurality of sheets sorted by the sorting function. The stapler 41 has a function of stapling together the sheets by multi-positions thereof. Therefore, the stapling function staples together the positions to be stapled, selected by the user, with respect to the plurality of sheets sorted by the sorting function.

Figure 2:
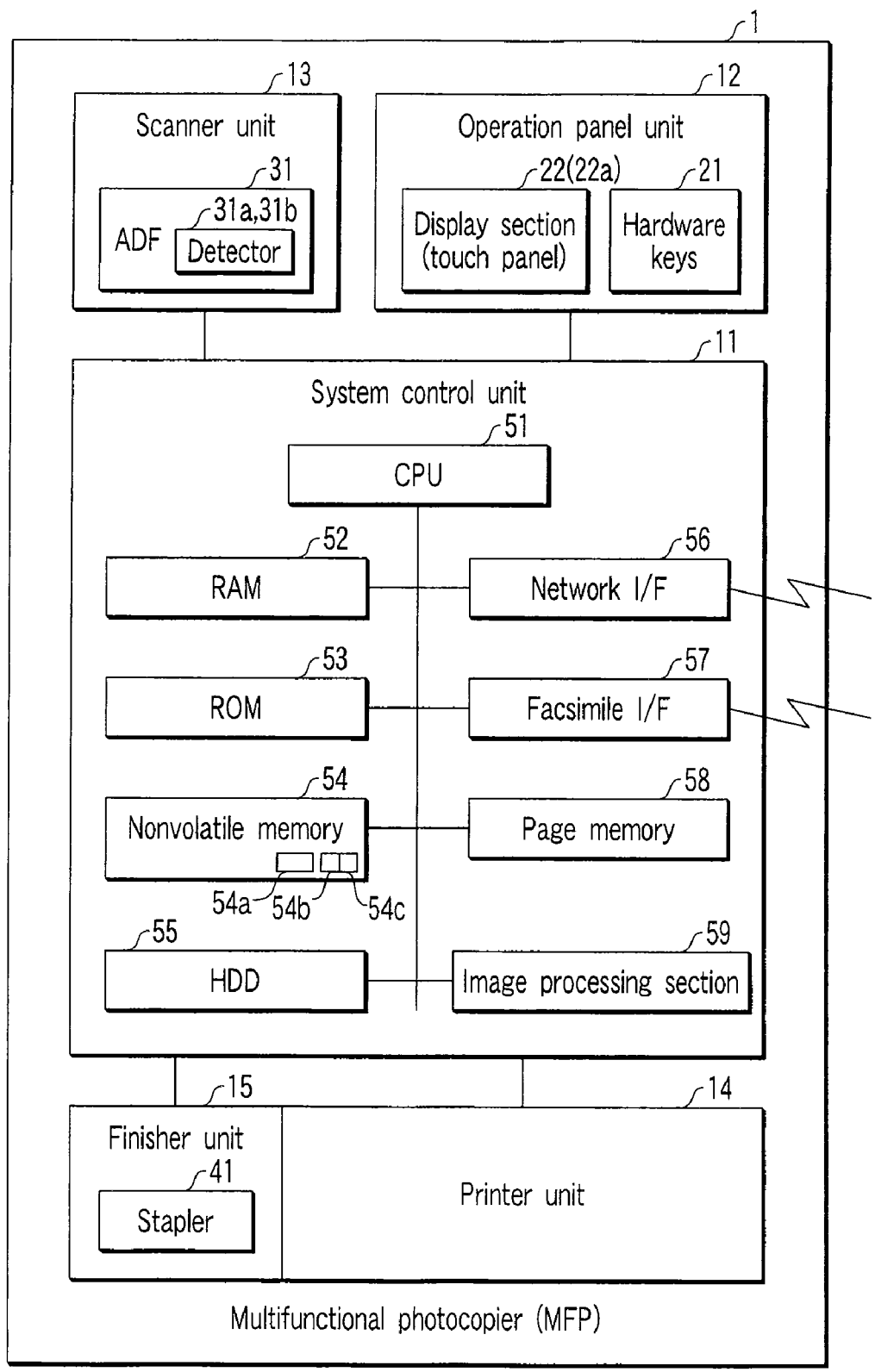
FIG. 2 is a block diagram showing a constitution of a control system of the digital multifunction peripherals 1 as the image forming apparatus in the embodiment of the present invention.

FIG. 2 is a block diagram showing a constitution of a control system of the digital multifunction peripherals 1 as an image forming apparatus in the embodiment of the present invention.

As shown in FIG. 2, in this digital multifunction peripherals 1, the system control unit 11 is connected to the operation panel 12, the scanner unit 13, the printer unit 14, and the finisher unit 15.

The system control unit 11 controls the operation panel 12, the scanner unit 13, the printer unit 14, the finisher unit 15 and the like. The system control unit 11 has various functions of performing various types of processing based on signals supplied from the operation panel 12, the scanner unit 13, the printer unit 14 and the finisher unit 15.

The operation panel 12 has the hardware keys 21, the display section 22 in which the touch panel 22a is built and the like. In the display section 22, there are displayed an operation guidance, keys (icons) selectable by the touch panel 22a and the like under a display control of the system control unit 11. In the operation panel 12, the user operates the hardware keys 21, or inputs the icon selectable by the touch panel 22a. The operation panel 12 supplies, to the system control unit 11, information input by the user (the information indicating the hardware key 21 pressed by the user or the icon selectable by the touch panel 22a touched by the user).

The scanner unit 13 converts the image of the draft into image data under the control of the system control unit 11. The scanner unit 13 converts the draft image into color or monochromatic digital image data. The scanner unit 13 supplies the digital image data as the read draft image to the system control unit 11.

Moreover, the scanner unit 13 has the ADF 31 provided with the detectors 31a, 31b. Detection signals of the detectors 31a, 31b of the ADF 31 are supplied to the system control unit 11. The system control unit 11 realizes an ADF draft size detecting function of detecting a size of the draft set in the ADF 31 based on the detection signals of the detectors 31a, 31b.

The printer unit 14 prints the image on the sheet as the image forming medium under the control of the system control unit 11. A result of the print processing performed by the printer unit 14 and the like are notified to the system control unit 11. The printer unit 14 performs color printing to form a color image on the image forming medium based on the color image data, or monochromatic printing to form a monochromatic image on the image forming medium based on the monochromatic image data. The printer unit 14 is constituted of: for example, the conveying section (not shown) which conveys the image forming medium; the image forming section (not shown) which forms the color image or the monochromatic image on the image forming medium conveyed by the conveying section and the like.

The finisher unit 15 performs various types of processing with respect to the sheet as the image forming medium printed by the printer unit 14 under the control of the system control unit 11. The processing result and the like of the finisher unit 15 are notified to the system control unit 11. The finisher unit 15 executes a finishing function such as the stapling function, the sorting function, or the stacking function based on the control by the system control unit 11.

Moreover, as shown in FIG. 1, the system control unit 11 is constituted of: a central processing unit (CPU) 51; a random access memory (RAM) 52; a read only memory (ROM) 53; a nonvolatile memory 54; a hard disk drive (HDD) 55; a network interface (I/F) 56; a facsimile interface (I/F) 57; a page memory 58; an image processing section 59 and the like.

The CPU 51 controls the whole system control unit 11. The CPU 51 executes a program stored in the ROM 53, the nonvolatile memory 54 or the HDD 55 to thereby perform various types of processing. For example, the CPU 51 executes the control program to thereby realize the ADF draft size detecting function. A display control of the display section 22 of the operation panel 12 is executed by the CPU 51 based on the program and control data stored in the ROM 53, the nonvolatile memory 54, or the HDD 55.

The RAM 52 is a memory which temporarily stores data for working or which stores data to be referred to. The RAM 52 is used as a main memory for executing various types of processing based on various control programs. In the RAM 52, there is held information indicating various set contents during an operation of the digital multifunction peripherals. For example, the information indicating the set contents of the photocopy processing is also held by the RAM 52.

It is to be noted that the set contents of the photocopy processing include set particulars such as a photocopy magnification, the number of sheets to be photocopied and a finishing mode (position to be stapled, etc.) in addition to a draft setting and a sheet setting. The draft setting includes a size of a draft, a draft setting direction, a direction of the image in the draft, the surface of the draft to be read (a draft reading mode is single-sided or double-sided) and the like. The sheet setting includes a size of the sheet, a direction of the sheet, a direction of the image in the sheet, the surface of the sheet to be printed (a sheet printing mode is single-sided or double-sided) and the like.

The ROM 53 is a nonvolatile memory. In the ROM 53, there are stored, for example, a control program, control data and the like for controlling the digital multifunction peripherals 1. In the ROM 53, there may be stored display data and the like to be displayed in the display section 22 of the operation panel 12.

The nonvolatile memory 54 is a rewritable nonvolatile memory. In the nonvolatile memory 54, there is stored data such as system setting information. The nonvolatile memory 54 may store display data and the like to be displayed in the display section 22 of the operation panel 12.

Moreover, the nonvolatile memory 54 is provided with a default setting storage section 54a, a counter 54b and a counter 54c. The default setting storage section 54a stores default setting information on set particulars concerning the photocopy processing. The counter 54b is a counter for counting the number of times when a direction of the image is set to that of portrait. The counter 54c is a counter for counting the number of times when the direction of the image is set to that of landscape. It is to be noted that the default setting storage section 54a, the counter 54b and the counter 54c may be disposed in a nonvolatile memory such as the HDD 55.

The HDD 55 is a large-capacity storage device. In the HDD 55, there are stored various data such as various setting data, management data, control program and control data. In the HDD 55, there are also stored display data and the like to be displayed in the display section 22 of the operation panel 12. In the HDD 55, there are also stored image data and the like read by the scanner unit 13. Furthermore, the HDD 55 may be used as a backup memory for various memories.

The network interface 56 performs data communication via the network. The network interface 56 is constituted of, for example, a network interface card (NIC) and the like. The digital multifunction peripherals 1 realizes a network printing function of printing, on the sheet, print data from an external device connected to the network interface 56 via the network.

The facsimile interface 57 transmits and receives facsimile data. In the digital multifunction peripherals 1, a facsimile function is realized using the facsimile interface 57. For example, facsimile reception processing is realized by monochromatically printing, by the printer unit 14, the facsimile data received by the facsimile interface 57. Moreover, the facsimile interface 57 realizes facsimile transmission processing by transferring, to a destination, the facsimile data converted from the image data of the draft read by the scanner unit 13.

The page memory 58 is a memory in which the image data to be printed by the printer unit 14 and the like are stored. The page memory 58 is controlled by a page memory controller (not shown). For example, in a case where the printer unit 14 performs the print processing, in the page memory 58 there is developed (stored) the color image data or the monochromatic image data of each page to be printed by the printer unit 14.

The image processing section 59 subjects the image data to various types of image processing. The image processing section 59 is constituted of an image processing circuit and the like. The image processing section 59 performs image processing such as correction, compression, or extension of the image data.

Next, there will be described a constitution of the operation panel 12.

Figure 3:
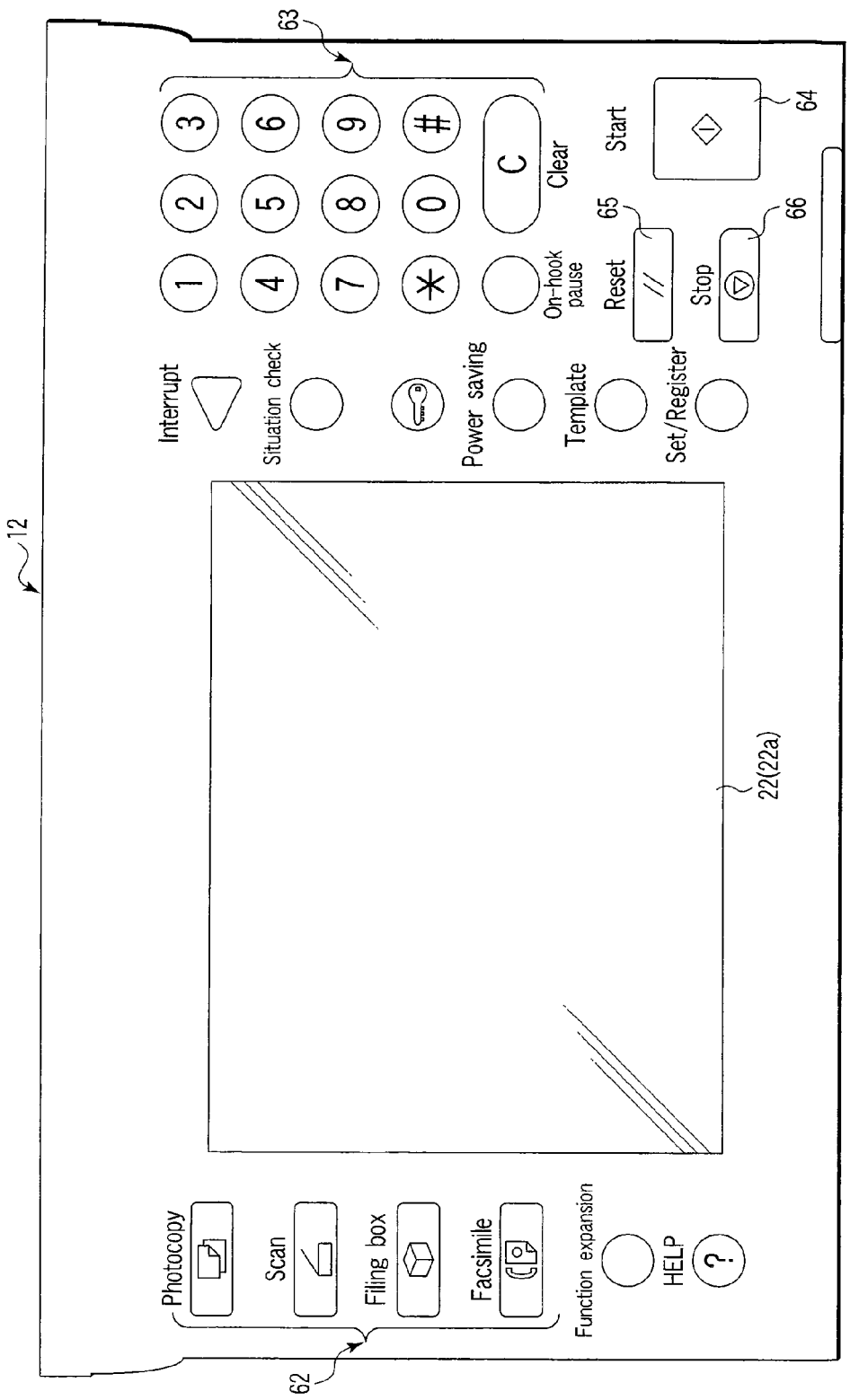
FIG. 3 is an appearance diagram showing a constitution example of an operation panel.

FIG. 3 is an appearance diagram showing a constitution example of the operation panel 12.

As shown in FIG. 3, the operation panel 12 is provided with various hardware keys 21, the display section 22 in which the touch panel 22a is built and the like. Examples of the hardware keys 21 include function selecting keys 62, ten keys 63, a start key 64, a reset key 65 and a stop key 66.

The function selecting keys 62 are hardware keys for selecting various functions. Examples of the function selecting keys 62 include a scanning function selecting key for selecting a scanning function, a photocopy function selecting key for selecting a photocopy function and a FAX function selecting key for selecting a facsimile function.

The ten keys 63 are hardware keys for inputting numerals and the like. The ten keys 63 are used in inputting information such as the number of sheets to be photocopied, a photocopy magnification and a personal identification number for management. The start key 64 is a hardware key for instruction start of an operation. For example, in the photocopy function, a photocopy operation is started in response to an instruction of the start key 64. The reset key 65 is a hardware key for instructing reset of the set contents and the like. For example, when the reset key 65 is input, the set contents and the like designated by the user are reset, and changed into a default set value. The stop key 66 is a hardware key for instructing discontinuation of the operation being executed by the digital multifunction peripherals. For example, when the stop key 66 is indicated during the photocopy operation of the digital multifunction peripherals, the photocopy operation is stopped.

Moreover, in addition to the above-described keys, the operation panel 12 shown in FIG. 3 includes, as the hardware keys 21: a help (HELP) key to instruct display of a user guidance; a set/register key to instruct execution of setting or registering; a template key to select a template as data registered beforehand; an interrupt key to demand an interrupt of an operation; a situation check key to confirm a state of the digital multifunction peripherals; a key to perform security setting or the like; a power saving key for switching a power saving operation mode to reduce power consumption and a usual operation mode; an on-hook/pause key to bring a phone function into an on-hook state; a clear key to clear numerals and the like input by the ten keys and the like. Furthermore, the operation panel 12 shown in FIG. 3 also includes an alarm display to notify an abnormality of the digital multifunction peripherals and the like.

The display section 22 is constituted of a liquid crystal display in which the touch panel 22*a* is built. In the display section 22, various operation screens are displayed. Each operation screen displayed in the display section 22 displays a key (icon) selectable by the touch panel 22*a* in addition to the operation guidance and the like. An example of a screen displayed in the display section 22 will be described later in detail.

The display contents displayed in the display section 22 are controlled by, for example, the system control unit 11. The display data to be displayed in the display section 22 is stored in a storage device of the system control unit 11, such as the HDD 55, the nonvolatile memory 54 or the ROM 53. That is, the storage device (the HDD 55, the nonvolatile memory 54 or the ROM 53) of the system control unit 11 stores data such as the screen, guidance, icon or graphical image to be displayed in the display section 22.

The CPU 51 of the system control unit 11 judges user's operation contents or display contents in accordance with an operation situation of each component. Based on this judgment, the CPU 51 of the system control unit 11 executes a control in reading the display data to be displayed in the display section 22 from the HDD 55, the nonvolatile memory 54 or the ROM 53 to display the data in the display section 22. That is, the CPU 51 of the system control unit 11 controls the display of the display section 22 in accordance with the user's operation contents or the operation situation of each component. The guidance, the icon, the graphical image and the like displayed in the screen of the display section 22 are controlled by the CPU 51 of the system control unit 11 in accordance with the user's operation contents or the operation situation of each component.

Next, there will be described various operation screens to be displayed in the display section 22 of the operation panel 12, and processing in a state in which each operation screen is displayed.

First, there will be described a display example of a basic screen 70 displayed in the display section 22 of the operation panel 12, and a processing example in a state in which the basic screen 70 is displayed.

Figure 4:
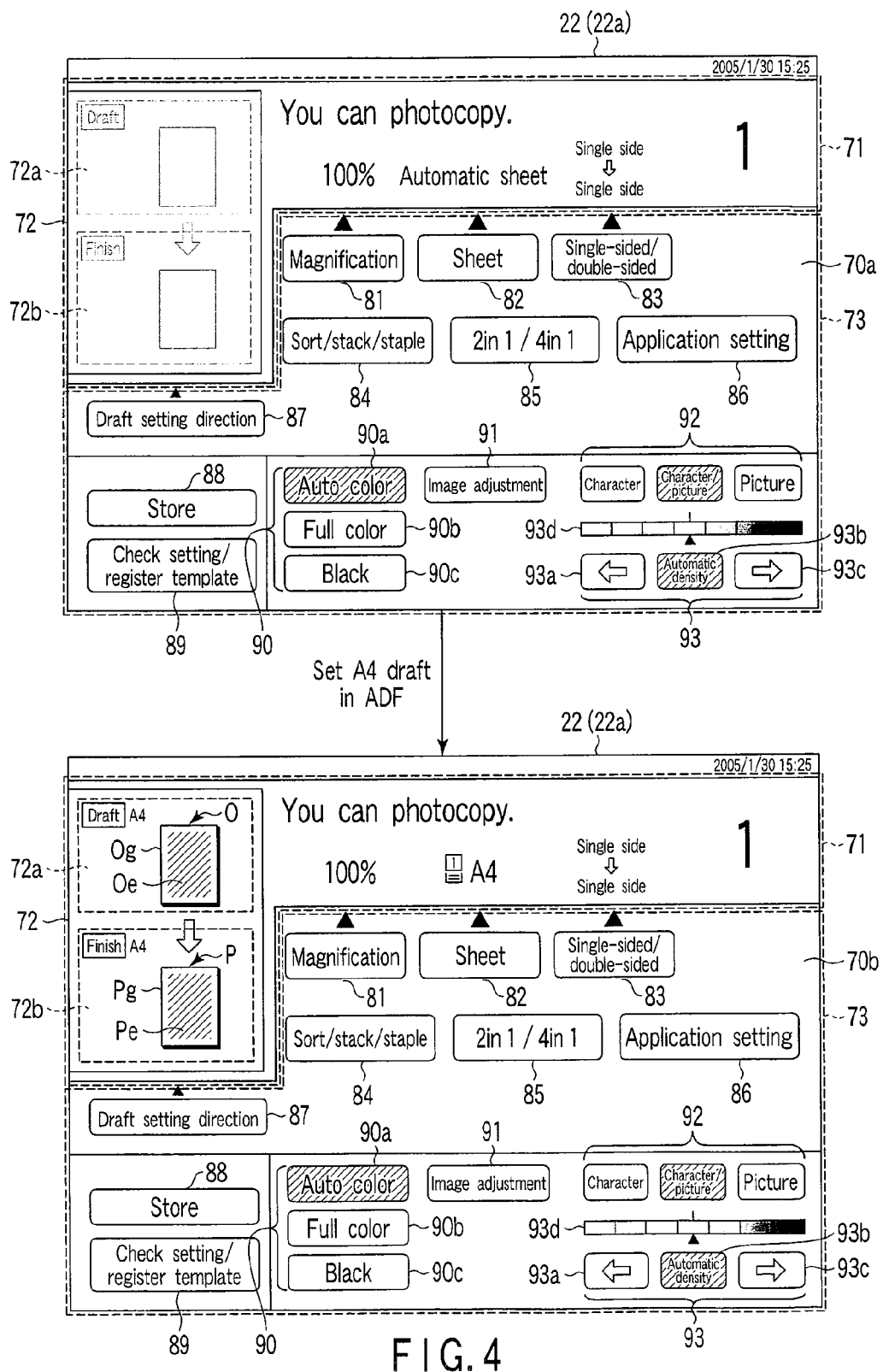
FIG. 4 is a diagram showing a display example of a basic screen in a photocopy mode.
Figure 5:
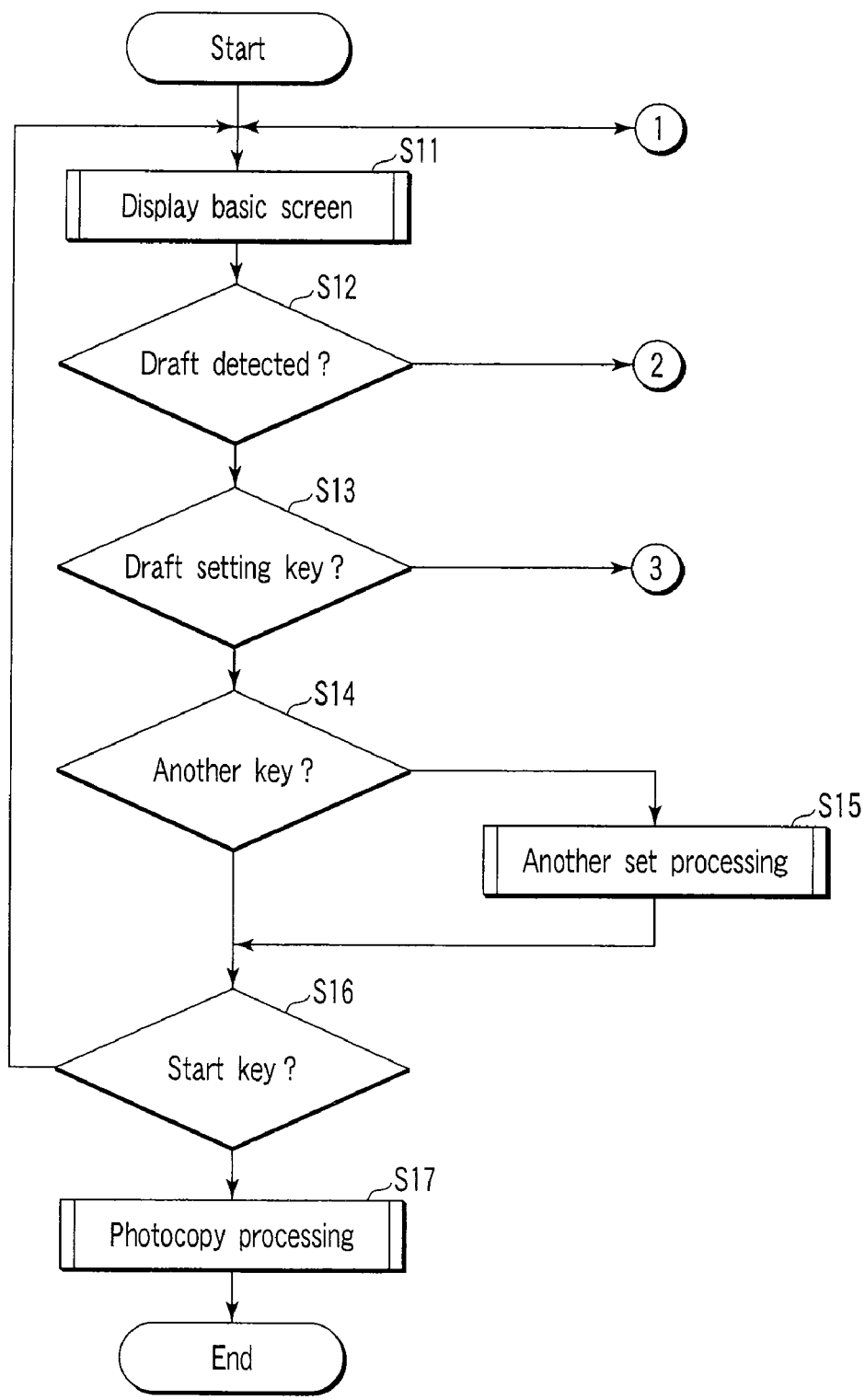
FIG. 5 is a flowchart showing a processing example in a state in which the basic screen is displayed.

FIG. 4 is a diagram showing a display example of the basic screen 70 (70*a*, 70*b*) in a photocopy mode. FIG. 5 is a flowchart showing a processing example in a state in which the basic screen 70 is displayed. It is to be noted that in the following description, there is assumed a case where the draft is set in the ADF 31.

The basic screen 70 is displayed in the display section 22 in a case where the digital multifunction peripherals has a photocopy mode. Even in a case where various set contents are set in the photocopy mode, the basic screen 70 is displayed in a state in which the set contents are reflected. The basic screen 70*a* shown in FIG. 4 shows a display example of the basic screen displayed in the display section 22 in a case where the digital multifunction peripherals is brought into a standby state in the photocopy mode (i.e., a case where various settings are brought into default set states). The basic screen 70*b* shown in FIG. 4 shows a display example of the basic screen displayed in the display section 22 in a case where an "A4" draft is set in the ADF 31 of the digital multifunction peripherals brought into the standby state.

First, in a case where the digital multifunction peripherals is brought into the photocopy mode, the CPU 51 of the system control unit 11 displays the basic screen 70*a* shown in FIG. 4 in the display section 22 of the operation panel 12 in the standby state (step S11). When the draft is set on the ADF 31 in this state (step S12, YES), the CPU 51 of the system control unit 11 performs draft size detection processing by the ADF draft size detecting function, and performs draft set processing and sheet set processing based on a detection result of the draft size. There will be described later in detail the draft set processing and the sheet set processing based on the detection result of this draft size.

In the display example shown in FIG. 4, the basic screen 70*a* or 70*b* has display areas such as a guidance display area 71, a draft and sheet setting display area 72, and a function setting button display area 73.

In the display area 71, there are displayed a message, a magnification, a sheet size, a photocopy side (single-sided/double-sided), the number of sheets to be photocopied and the like. As the message, a present state of the digital multifunction peripherals or the like is displayed. As the magnification, the presently set magnification is displayed. As the sheet size, the presently set sheet size is displayed. As the photocopy side, the presently set mode is displayed: a mode (single-sided/single-sided mode) to photocopy a single side of the draft on a single side of the sheet; a mode (single-sided/double-sided mode) to photocopy the single side of the draft on double sides of the sheet; a mode (double-sided/single-sided mode) to photocopy the double sides of the draft on the single side of the sheet; or a mode (double-sided/double-sided mode) to photocopy the double sides of the draft on the double sides of the sheet. As the number of the sheets to be photocopied, the presently set print number (photocopy number) is displayed.

The display area 72 is provided with a first display area 72a and a second display area 72b.

In the first display area 72a, there is displayed information indicating the presently set draft. For example, in the first display area 72a, a draft graphical image O is displayed together with character information indicating the draft size. The draft graphical image O displayed in the first display area 72a shows the draft size, the draft disposing direction (setting direction), the direction of the image in the draft (portrait or landscape), the surface of the draft to be read (one surface or both surfaces), a state of a special setting (staple setting or the like) and the like.

The draft graphical image O is an image obtained by superimposing (synthesizing), on a graphical image (draft state image) Oa indicating the whole draft state as a draft setting, an area image (draft image area image) Ob indicating an area of the draft image on the draft and a mark (image direction mark) Oc indicating the direction of the image on the draft. Moreover, the image direction mark Oc is displayed if necessary based on a set situation.

For example, in the basic screen 70b of FIG. 4, in the draft graphical image O, the draft image area image Ob is synthesized with the draft state image Oa indicating that the draft setting is "A4, vertically disposed, and single-sided". In this case, the image direction mark Oc is not displayed in the draft graphical image O.

It is to be noted that on the draft graphical image O, there may be superimposed and displayed a mark (staple region mark) indicating a staple position setting.

According to such draft graphical image O the user can visually, intuitively and easily recognize the present draft setting.

The second display area 72b displays information indicating finish (sheet as a photocopy result) in a case where the sheet is printed with the present set contents. The second display area 72b displays a graphical image P of the finish together with the character information indicating a finish size (photocopy sheet size). The finished graphical image P displayed in the second display area 72b shows the size of the sheet (photocopy sheet) on which the draft image is to be printed, the direction of the sheet, the direction of the image (portrait or landscape) to be printed on the sheet, the surface of the sheet to be printed (single-sided/double-sided) and the like.

The finished graphical image P is an image obtained by superimposing (synthesizing), on a graphical image (finished state image) Pa indicating the whole finish (sheet) state as a sheet setting, a graphical image (printed image area image) Pb indicating an area (printed region) of the draft image to be printed on the sheet and a mark (image direction mark) Pc indicating the direction of the image to be printed on the sheet. The image direction mark Pc is displayed if necessary based on a set situation in the same manner as in the image direction mark Oc.

For example, in the basic screen 70b of FIG. 4, in the finished graphical image P, the printed image area image Pb is synthesized with the sheet (finished) state image Pa indicating that the sheet setting is "A4, vertically disposed, and single-sided". In this case, the image direction mark Pc is not displayed in the finished graphical image P.

It is to be noted that on the finished graphical image P, there may be superimposed and displayed a mark (staple position mark) indicating a staple position setting.

According to such finished graphical image P, the user can visually, intuitively and easily recognize the present sheet setting, and can further easily predict the finished state.

Moreover, as shown in FIG. 4, the first display area is adjacent to the second display area. Furthermore, the draft graphical image O displayed in the first display area is associated with the finished graphical image P displayed in the second display area by a mark such as an arrow. Therefore, the user can visually and intuitively associate the set contents of the draft setting with those of the sheet (finish) setting to confirm them.

In the display area 73, there are displayed keys for setting various functions selectable by the touch panel 22a. The various keys displayed in the display area 73 are keys for performing various settings. The various keys displayed in the display area 73 are icons in which characters indicating the set contents and the like, patterns, graphics or the like are displayed.

The display area 73 displays: a magnification key 81; a sheet key 82; a photocopy side (single-sided/double-sided) key 83; a finishing setting (sort/stack/staple) key 84; an Nin1 (2in1/4in1) key 85; an application setting key 86; a draft setting (draft setting direction) key 87; a store key 88; a setting check key 89; a color mode setting portion (an auto color key 90a, a full color key 90b, and a black key 90c) 90; an image adjustment key 91; a draft mode setting portion (a character key 92a, a character picture key 92b, and a picture key 92c) 92; a density adjustment portion (a density down key 93a, a density up key 93b, an automatic density key 93c, and a density display portion 93d) 93 and the like.

The draft setting key 87 is constituted of an icon in which the "draft setting direction" is displayed. The draft setting key 87 is a key to be touched in setting a direction in which the draft is to be set. When the draft setting key 87 is touched (step S13, YES), the CPU 51 of the system control unit 11 displays, in the display section 22, a draft image direction setting screen for setting the draft setting direction. In this case, the CPU 51 performs the draft set processing in response to the key input in a state in which the draft image direction setting screen is displayed. It is to be noted that there will be described later in detail the draft image direction setting screen and the draft direction set processing.

The magnification key 81 is constituted of an icon in which "magnification" is displayed. The magnification key 81 is a key to be touched by the user in setting the magnification of the image to be printed on the sheet with respect to the image on the draft. When the magnification key 81 is touched (step S14, YES), the CPU 51 of the system control unit 11 displays a setting screen (magnification setting screen) for setting the magnification in the display section 22. In this case, the CPU 51 performs magnification set processing in response to the key input by the user in a state in which the magnification setting screen is displayed (step S15).

The sheet key 82 is constituted of an icon in which "sheet" is displayed. The sheet key 82 is a key to be touched by the user in setting the sheet size or the draft size. When the sheet key 82 is touched (step S14, YES), the CPU 51 of the system control unit 11 displays, in the display section 22, a setting screen (sheet setting screen) for setting the photocopy sheet size or the draft size. In this case, the CPU 51 performs the sheet set processing in response to the key input in a state in which the sheet setting screen is displayed (step S15).

The photocopy side (single-sided/double-sided) key 83 is constituted of an icon in which "single-sided/double-sided" is displayed. The photocopy side key 83 is a key to be touched by the user in setting the photocopy side. When the photocopy side key 83 is touched (step S14, YES), the CPU 51 displays, in the display section 22, a setting screen (photocopy side setting screen) for setting one of the single-sided/single-sided mode, the single-sided/double-sided mode, the double-sided/ single-sided mode and the double-sided/double-sided mode as a photocopy side mode. In this case, the CPU 51 performs the photocopy side set processing in response to the key input in a state in which the photocopy side setting screen is displayed (step S15).

Moreover, the magnification key 81, the sheet key 82 and the photocopy side key 83 are disposed in the vicinity of the display area 71. The magnification key 81, the sheet key 82 and the photocopy side key 83 are associated with the magnification, the sheet and the photocopy side displayed in the guidance display area 71. The magnification setting, the sheet setting and the photocopy side setting are basic set particulars for frequent use in the photocopy mode. Therefore, the magnification key 81, the sheet key 82 and the photocopy side key 83 are disposed in the vicinity of the display area 71 so that the user easily touches the keys, and easily check the set contents.

The finishing (sort/stack/staple) setting key 84 is constituted of an icon in which the "sort/stack/staple" is displayed. The finishing setting (sort/stack/staple) key 84 is a key to be touched in setting contents of finishing processing performed by the finisher unit 15.

In a case where the finishing setting key 84 is touched (step S14, YES), the CPU 51 displays, in the display section 22, a setting screen (finishing setting screen) for setting the finishing (sort/stack/staple). In this case, the CPU 51 performs the finishing set processing in response to the key input in a state in which the finishing setting screen is displayed (step S15).

The Nin1 (2in1/4in1) key 85 is constituted of an icon in which "2in1/4in1" is displayed. The Nin1 key 85 is a key to be touched in setting photocopy (Nin1 photocopy) in an Nin1 mode in which an image for N (e.g., 2 or 4) pages of the draft is to be printed on one sheet. When the Nin1 key 85 is touched (step S14, YES), the CPU 51 of the system control unit 11 displays, in the display section 22, an Nin1 setting screen for setting an Nin1 mode. In this case, the CPU 51 performs Nin1 set processing in response to the key input in a state in which the Nin1 setting screen is displayed (step S15).

The application setting key 86 is constituted of an icon in which "application setting" is displayed. The application setting key 86 is a key to be touched in setting contents other than those set by each key displayed in the display area 73 or the hardware key 21. When the application setting key 86 is touched (step S14, YES), the CPU 51 of the system control unit 11 displays, in the display section 22, an application setting screen for setting application. In this case, the CPU 51 performs application set processing in response to the key input in a state in which the application setting screen is displayed (step S15).

It is to be noted that when the application setting key 86 is touched, in the display section 22, an operation screen (application menu) is displayed to perform various settings as application settings. This application menu displays keys to set, for example, a binding margin, border erase, eliminating of booklet center joints, continuous page photocopy, magazine sorting (bookbinding mode), mirror image, negative/positive reversing, independent scaling, addition of date and time, addition of pages and the like. The Nin1 photocopy may be set in the operation screen (application menu) for application setting.

The color mode setting portion 90 is constituted of keys for designating a color mode. The color mode setting portion 90 is constituted of the auto color key 90*a*, the full color key 90*b* and the black key 90*c*. The auto color key 90*a* is constituted of an icon in which "auto color" is displayed. The full color key 90*b* is constituted of an icon in which "full color" is displayed. The black key 90*c* is constituted of an icon in which "monochromatic photocopy" is displayed.

The auto color key 90*a* is a key for judging whether the draft is chromatic or monochromatic, and setting color photocopy or monochromatic photocopy in accordance with the judgment result. The full color key 90*b* is a key for setting the color photocopy. The black key 90*c* is a key for setting the monochromatic photocopy.

The image adjustment key 91 is constituted of an icon in which "image adjustment" is displayed. The image adjustment key 91 is a key to be touched in performing setting to adjust the image. In a case where the image adjustment key 91 is touched (step S14, YES), the CPU 51 displays, in the display section 22, a setting screen for setting color balance, RGB adjustment, image quality adjustment, substrate adjustment, sharpness, two-color photocopy and the like. In this case, the CPU 51 adjusts the image in response to the input key (step S15).

The draft mode setting portion 92 is a key for selecting a type of the image to be photocopied. The draft mode setting portion 92 is constituted of the character key 92*a*, the character picture key 92*b* and the picture key 92*c*. The character key 92*a* is constituted of an icon in which "character" is displayed. The character picture key 92*b* is constituted of an icon in which "character picture" is displayed. The picture key 92*c* is constituted of an icon in which "picture" is displayed.

The character key 92*a* is a key to be selected in a case where the image to be photocopied is a binary image (image constituted of white or black pixels) or an image to be processed as the binary image. For example, since the image constituted of characters has less grey-level pixels, the image is preferably photocopied as the binary image. Therefore, in a case where the image to be photocopied is constituted of the characters, the character key 92*a* is selected.

The picture key 92*c* is a key to be selected in a case where the image to be photocopied is an image having multiple tones. For example, since an image such as a picture has many grey-level pixels, the image is preferably photocopied as the multiple-tone image. Therefore, when the image to be photocopied is constituted of the picture, the picture key 92*c* is selected.

The character picture key 92*b* is a key to be selected in a case where the image to be photocopied is an image mixed with the binary image and the multiple-tone image. For example, the character picture key 92*b* is selected, in a case where the image to be photocopied is an image mixed with the characters and the picture.

The density adjustment portion 93 is constituted of keys for setting a photocopy density. The density adjustment portion 93 is constituted of the density down key 93*a*, the density up key 93*b*, the automatic density key 93*c*, the density display portion 93*d* and the like. The density down key 93*a* is constituted of an icon in which "←" is displayed. The density up key 93*b* is constituted of an icon in which "→" is displayed. The automatic density key 93*c* is constituted of an icon in which "automatic density" is displayed. In the density display portion 93*d*, the presently set photocopy density is displayed.

The density down key 93*a* is a key to be touched in a case where the photocopy density is reduced. Every time the density down key 93*a* is touched, the photocopy density is set to gradually decrease from the presently set photocopy density. The density up key 93*b* is a key to be touched in a case where the photocopy density is increased. Every time the density up key 93*b* is touched, the photocopy density is set to gradually increase from the presently set photocopy density. The automatic density key 93*c* is a key to be touched in a case where the photocopy density is set based on a predetermined reference value.

Moreover, in a case where any key of the color mode setting portion 90, the image adjustment key 91, the draft mode setting portion 92 and the density adjustment portion 93 is touched (step S14, YES), the CPU 51 of the system control unit 11 changes the set contents in response to the input key (step S15), and the set contents are reflected in the basic screen 70.

The store key 88 is constituted of an icon in which "store" is displayed. The store key 88 is a key to be touched in storing the present set contents. The setting check key 89 is constituted of an icon in which "check setting/register template" is displayed. The setting check key 89 is a key to be touched in a case where the present set contents are checked, or registered as a template. When the setting check key 89 is touched, the CPU 51 of the system control unit 11 displays, in the display section 22, a setting check screen displaying the present set contents. The above various set contents concerning the photocopy processing are retained as setting information in the RAM 52.

Moreover, in a case where the start key 64 is input in a state in which the basic screen 70 is displayed (step S16, YES), the CPU 51 executes the photocopy processing based on the set contents displayed in the basic screen 70 (step S17).

Next, there will be described a processing example of automatic draft set processing based on a detection result of the ADF draft size detecting function.

Figure 6:
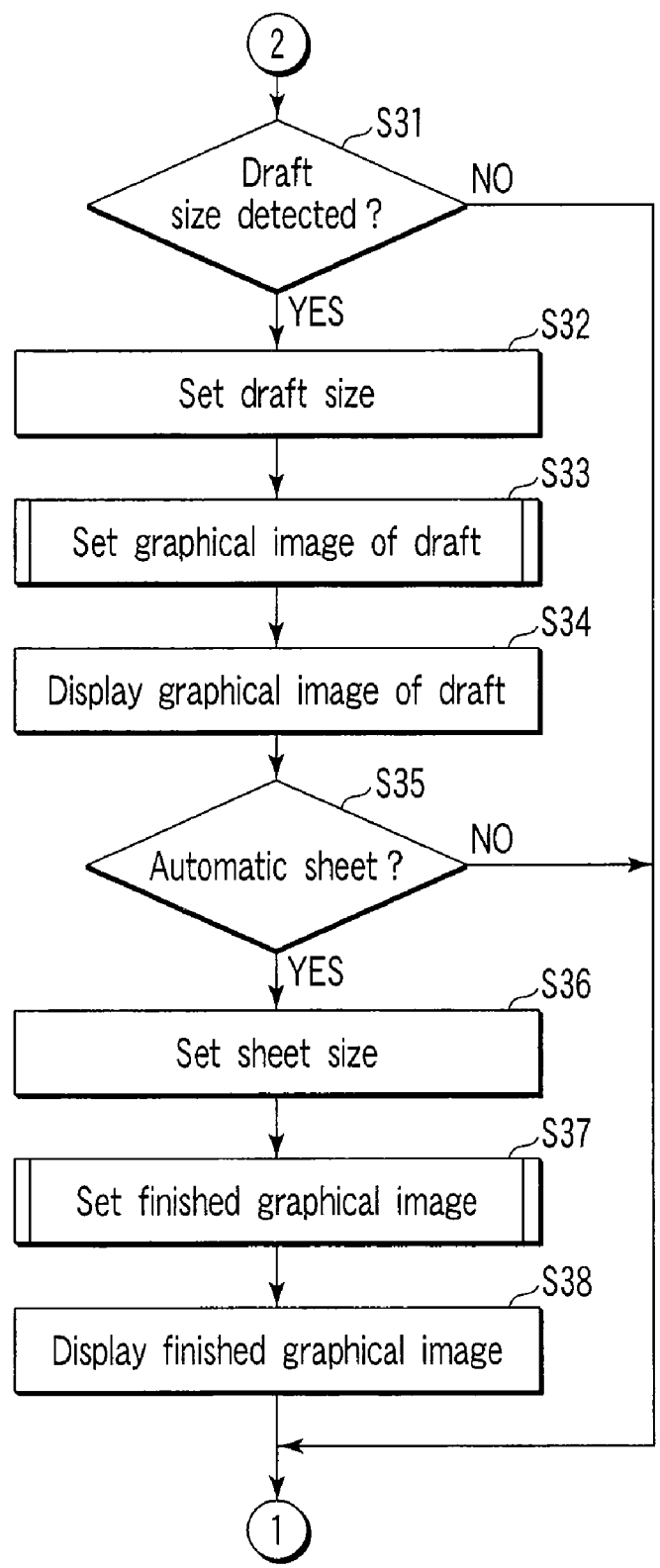
FIG. 6 is a flowchart showing a processing example of automatic draft set processing.

FIG. 6 is a flowchart showing a processing example of the automatic draft set processing. Here, it is assumed that the ADF draft size detecting function is valid. In the following description, it is assumed that the basic screen 70 is displayed in the display section 22 of the operation panel 12.

In a case where the draft is set on the draft table of the ADF 31, when the ADF draft size detecting function is effective, the CPU 51 of the system control unit 11 performs the automatic draft set processing.

First, when the draft is set on the draft table of the ADF 31, among a plurality of sensors 31b disposed on the draft table of the ADF 31, the sensor 31b corresponding to a position where the draft has been set supplies a detection signal indicating that the draft has been detected to the CPU 51 of the system control unit 11. On receiving, from any sensor 31b, the detection signal indicating that the draft has been detected, the CPU 51 of the system control unit 11 judges that the draft has been set on the draft table.

When it is judged that the draft has been set on the draft table of the ADF 31, the CPU 51 judges whether or not the ADF draft size detecting function is valid (step S31). In a case where the ADF draft size detecting function is invalid (step S31, NO), processing of steps S32 to S38 described later is cancelled. For example, when the user designates the draft size, the CPU 51 invalidates the ADF draft size detecting function. When the ADF draft size detecting function is valid (step S31, YES), the CPU 51 detects the size of the draft set on the draft table based on a signal indicating a position of the guide section 31a functioning as a draft size detector and a detection signal of each sensor 31b indicating whether or not the draft exists.

For example, the ADF draft size detecting function judges a length of the draft in a direction perpendicular to a direction in which the draft is conveyed by the ADF 31 based on a signal of the guide section 31a indicating the position. Furthermore, the ADF draft size detecting function judges a length of the draft in a direction parallel to the direction in which the draft is conveyed by the ADF 31 based on the detection signal of each sensor 31b indicating the presence of the draft. Therefore, the CPU 51 of the system control unit 11 judges the draft size and the draft direction (setting direction) based on the length of the draft in the direction perpendicular to the direction of the draft conveyed by the ADF 31 and that of the draft in the direction parallel to the direction of the draft conveyed by the ADF 31.

On judging the size and the setting direction of the draft set in the ADF 31, the CPU 51 sets the draft size and the draft setting direction as the draft setting based on a judgment result (step S32). On setting the draft size and the draft setting direction, the CPU 51 performs draft graphical image set processing to set the draft graphical image O in accordance with the set draft size and setting direction (step S33). When the draft graphical image O is set, the CPU 51 displays the draft graphical image O in the first display area 72a (step S34).

This automatic draft set processing sets the draft size and the draft setting direction as judged by the ADF draft size detecting function. Therefore, in the draft graphical image set processing, as the draft graphical image O, a draft state image Oa is set which indicates at least the draft size and the draft setting direction. The draft graphical image set processing will be described later in detail.

Moreover, when the ADF draft size detecting function judges the draft size, the CPU 51 judges whether or not a sheet setting mode is set to "automatic sheet" (step S35). Here, the "automatic sheet" as the sheet setting mode is a mode to set the sheet size matched with the draft size as the sheet setting. For example, when the magnification is 100%, the sheet having a size equal to that of the draft is set. It is to be noted that when the sheet setting mode is not the "automatic sheet" (step S35, NO), the CPU 51 cancels processing of steps S35 to S37 described later.

When the sheet setting mode is the "automatic sheet" (step S35, YES), the CPU 51 sets the sheet size as the sheet setting to the size (magnitude and direction) in accordance with the draft size (step S36). On setting the sheet size, the CPU 51 sets the finished graphical image P in accordance with the set sheet size (step S37).

The finished graphical image P is a graphical image indicating the finish in a case where the photocopy processing is performed based on the present set contents. Here, the sheet size (magnitude and direction) is set. Therefore, as the finished graphical image P, the graphical image is set which indicates at least the sheet size (magnitude and direction). It is to be noted that the finished graphical image set processing will be described later in detail.

In a case where the image is set which is to be displayed as the finished graphical image P, the CPU 51 displays the set finished graphical image P in the second display area 72b (step S38).

According to the above-described automatic draft set processing, the size judged by the ADF draft size detecting function is set as the draft size, and the draft graphical image indicating the draft size is displayed in the first display area. Accordingly, the user can visually and intuitively confirm the draft size (magnitude and direction) judged by the ADF draft size detecting function.

Furthermore, in a case where the "automatic sheet" is set as the sheet setting mode, a size corresponding to the draft size judged by the ADF draft size detecting function is set as the sheet size, and the finished graphical image indicating the sheet size is displayed in the second display area. Accordingly, the user can visually confirm the size of the photocopy sheet (finish) together with the draft size (magnitude and direction).

Next, the draft setting will be described.

The draft setting includes the draft size, the draft direction (setting direction), a direction of an image in the draft (portrait or landscape) and the like. The size and setting direction of the draft set in the ADF 31 are detectable by the ADF draft size detecting function. Here, there will be described the draft setting in a case where the ADF draft size detecting function is valid.

Figure 7:
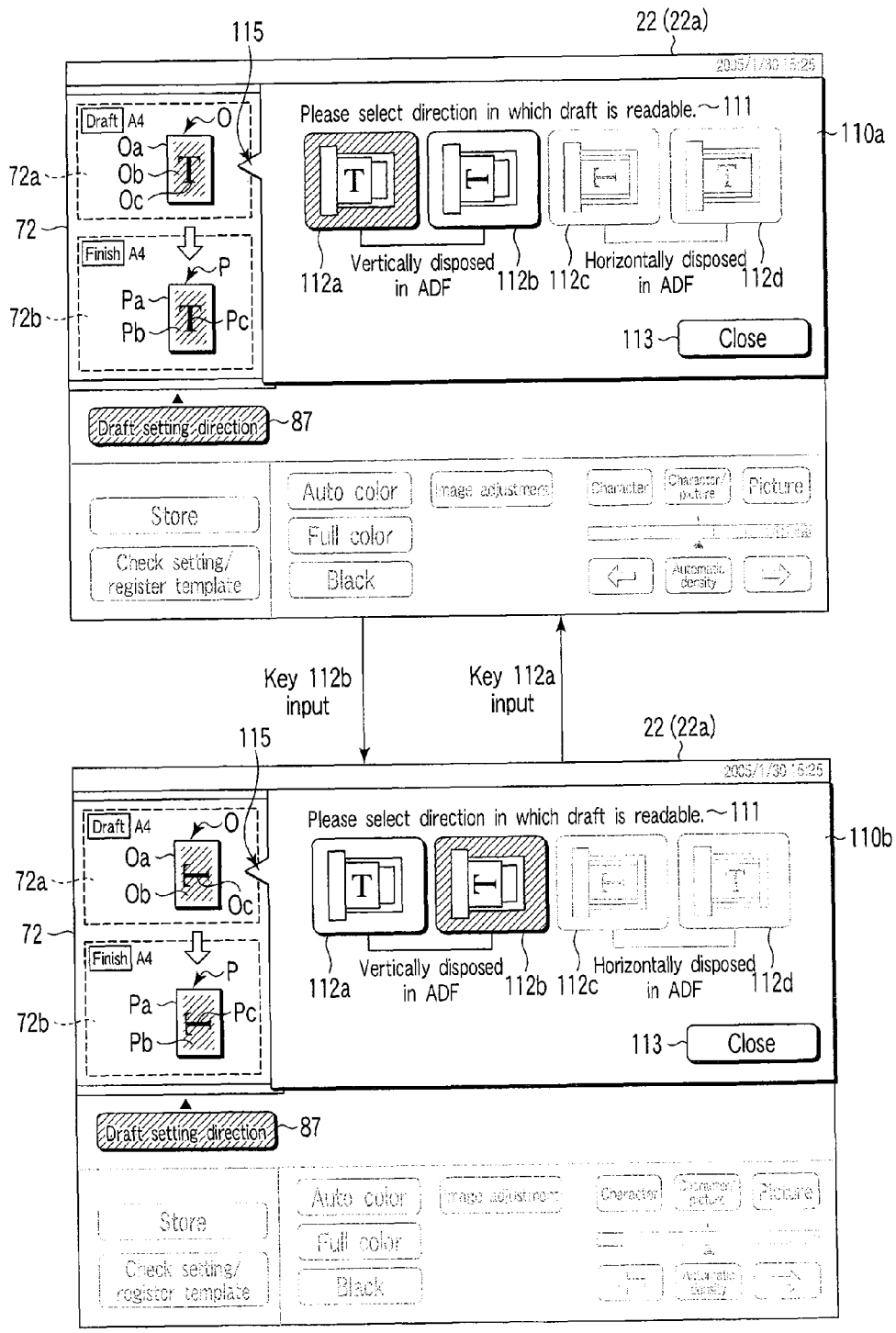
FIG. 7 is a diagram showing a display example of a draft image direction setting screen in a case where a draft vertically set in an ADF is detected.
Figure 8:
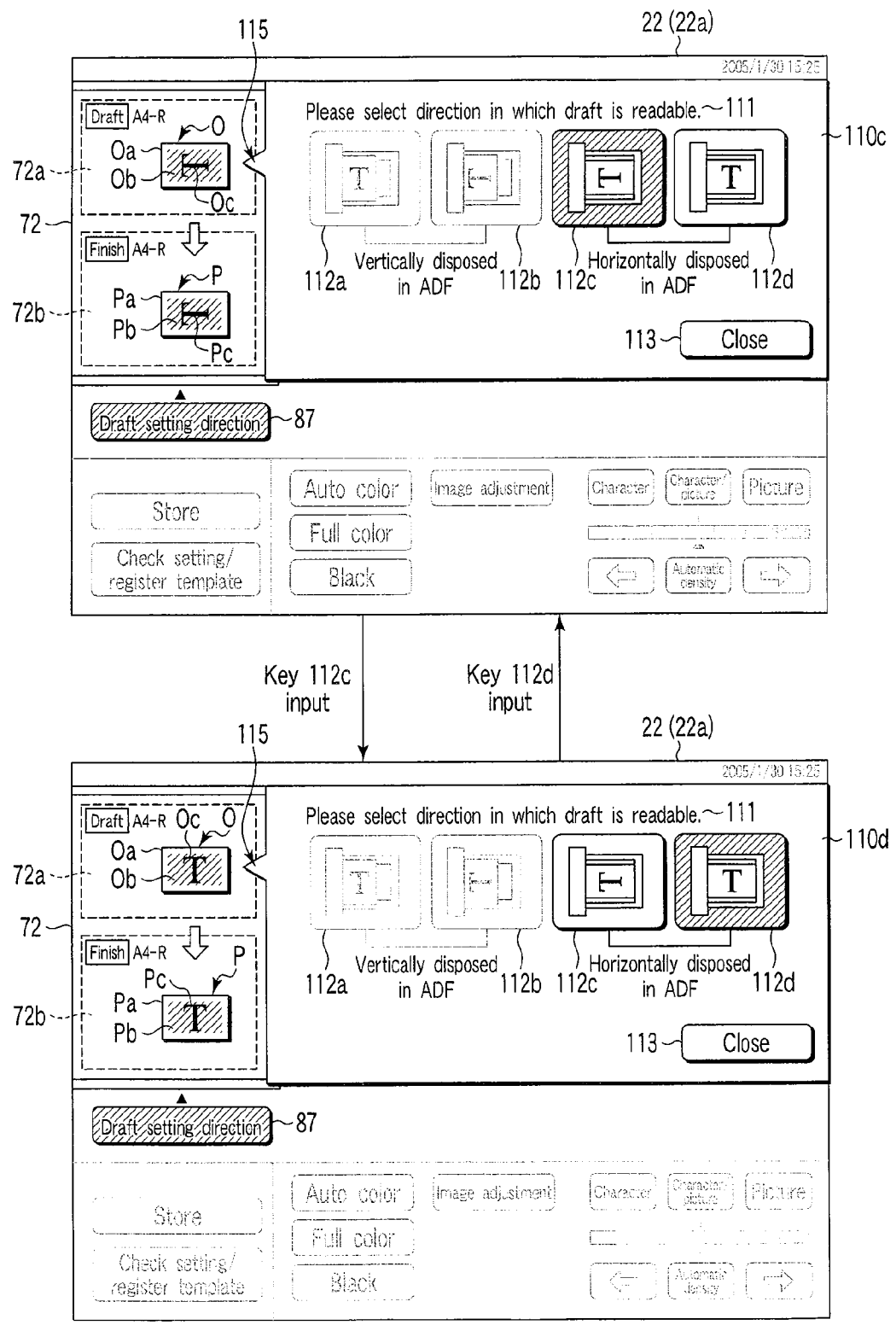
FIG. 8 is a diagram showing a display example of a draft image direction setting screen in a case where a draft horizontally set in the ADF is detected.

FIGS. 7 and 8 are diagrams showing display examples of a draft image direction setting screen 110 in a case where the ADF draft size detecting function is valid.

FIG. 7 is a diagram showing a display example of the draft image direction setting screen 110 (110*a*, 110*b*) in a case where the draft setting as the detection result of the ADF draft size detecting function is "A4 and vertical (vertically disposed)" and the sheet setting is "automatic sheet". Here, it is assumed that the vertically disposed setting means a state in which the draft is set in the ADF 31 so that the direction of the draft conveyed by the ADF 31 is perpendicular to a longitudinal direction of the draft.

Moreover, FIG. 8 is a diagram showing a display example of the draft image direction setting screen 110 (110*c*, 110*d*) in a case where the draft setting is "A4 and horizontal (horizontally disposed)" which is the detection result of the ADF draft size detecting function and the sheet setting is "automatic sheet". Here, it is assumed that the horizontally disposed setting means a state in which the draft is set in the ADF 31 so that the direction of the draft conveyed by the ADF 31 is parallel to the longitudinal direction of the draft.

The draft image direction setting screen 110 (110*a*, 110*b*, 110*c*, and 110*d*) is displayed as a popup window in a partial area of the basic screen 70 as shown in FIGS. 7 and 8. The draft image direction setting screen 110 displays a guidance display area 111, a vertically disposed portrait key 112*a*, a vertically disposed landscape key 112*b*, a horizontally disposed portrait key 112*c*, a horizontally disposed landscape key 112*d*, and a close key 113.

The draft image direction setting screen 110 is displayed as the popup window in a state in which the first display area 72*a*, the second display area 72*b* and the draft setting key 87 of the basic screen 70 remain to be displayed. In this state, in the first display area 72*a*, the draft graphical image O is displayed in accordance with the draft setting. In the second display area 72*b*, the finished graphical image P is displayed in accordance with the sheet setting.

Furthermore, the draft image direction setting screen 110 is associated and displayed with the draft graphical image O displayed in the first display area 72*a* by symbols, graphics or the like. For example, a blowoff shape 115 is formed in a portion brought close to the first display area 72*a* of the draft image direction setting screen 110 shown in FIGS. 7 and 8. This blowoff shape 115 visually or intuitively associates the draft graphical image O displayed in the first display area 72*a* with the draft image direction setting screen 110. According to this blowoff shape 115, the user can easily recognize that the draft image direction setting screen 110 is related to the draft setting.

The guidance display area 111 displays a guidance indicating that the direction of the image in the draft be selected. The close key 113 is touched in a case where the setting is ended. When the close key 113 is touched, in the display section 22, the draft image direction setting screen 110 is closed, and the basic screen 70 is displayed in which the set contents are reflected.

It is to be noted that in a state in which the draft image direction setting screen 110 is displayed, the storage key, color mode setting section, image adjustment key, draft mode setting section, density setting portion and the like in the basic screen 70*b* are displayed to be thin, and displayed in a state (whiteout) in which they cannot be selected.

Moreover, as shown in FIG. 7 or 8, in a case where the ADF draft size detecting function is valid, in the draft image direction setting screen 110, there is a restriction on selectable keys based on the draft setting direction detected by the ADF draft size detecting function.

For example, in a case where the draft vertically set in the ADF 31 is detected, in the draft image direction setting screen 110 (110*a*, 110*b*) the vertically disposed portrait key 112*a* and the vertically disposed landscape key 112*b* are displayed in selectable states (become valid). In this case, the horizontally disposed portrait key 112*c* and the horizontally disposed landscape key 112*d* are displayed to be thin, and displayed in non-selectable states (whiteout).

Moreover, as shown in FIG. 8, in a case where the draft horizontally set in the ADF 31 is detected, in the draft image direction setting screen 110 (110*c*, 110*d*), the horizontally disposed portrait key 112*c* and the horizontally disposed landscape key 112*d* are displayed in the selectable states (become valid). In this case, the vertically disposed portrait key 112*a* and the vertically disposed landscape key 112*b* are displayed to be thin, and displayed in non-selectable states (whiteout).

The vertically disposed portrait key 112*a* is a key to be selected in a case where the direction of the image in the draft vertically disposed in the ADF 31 is that of the portrait. The vertically disposed portrait key 112*a* is constituted of an icon displaying a graphical image graphically showing a state in which the portrait draft is vertically disposed in the ADF 31. Accordingly, it can easily and visually be recognized that the vertically disposed portrait key 112*a* is a key (icon) for selecting "vertically disposed, portrait" as the draft setting.

When the vertically disposed portrait key 112*a* is touched, the draft setting (setting of the draft set in the ADF 31) is set to "vertically disposed portrait". In this case, the draft graphical image O displayed in the display area 72*a* indicates "the draft size and the vertically disposed portrait".

It is to be noted that in the draft graphical image O, the draft size and setting direction are indicated by the draft state image Oa, and the direction of the image in the draft is indicated by the image direction mark Oc in the draft image area image Ob.

For example, in the draft image direction setting screen 110*a* shown in FIG. 7, the vertically disposed portrait key 112*a* is brought into the selected state. In this draft image direction setting screen 110*a*, the first display area 72*a* displays the draft graphical image O indicating "A4, vertically disposed, and portrait", and the second display area 72*b* displays the finished graphical image P indicating "A4, vertical, and portrait" and corresponding to the draft graphical image O. Furthermore, in the finished graphical image P of the draft image direction setting screen 110*a*, the printed image area image Pb displays the image direction mark Pc indicating the image direction (portrait) similar to the direction of the image in the draft. It is to be noted that in a case where a plurality of images are to be printed on one sheet, the finished graphical image P displays a plurality of printed image area images Pb (Pb1, Pb2, . . . ) corresponding to the images to be printed, and the printed image area images Pb (Pb1, Pb2, . . . ) display image direction marks Pc (Pc1, Pc2, . . . ) indicating directions of the images to be printed, respectively.

The vertically disposed landscape key 112*b* is a key to be selected in a case where the direction of the image in the draft vertically disposed in the ADF 31 is that of the landscape. The vertically disposed landscape key 112*b* is constituted of an icon displaying a graphical image graphically showing a state in which the landscape draft is vertically disposed in the ADF 31. Accordingly, it can easily and visually be recognized that the vertically disposed landscape key 112b is a key (icon) for selecting "vertically disposed, landscape" as the draft setting.

When the vertically disposed landscape key 112b is touched, the draft (set in the ADF 31) is set to the vertically disposed landscape draft. In this case, the draft graphical image O displayed in the display area 72a indicates "draft size, vertically disposed, and landscape".

For example, in the draft image direction setting screen 110b shown in FIG. 7, the vertically disposed landscape key 112b is brought into the selected state. In this draft image direction setting screen 110b, the first display area 72a displays the draft graphical image O indicating "A4, vertically disposed, and landscape", and the second display area 72b displays the finished graphical image P indicating "A4, vertical, and landscape (corresponding to draft)" and corresponding to the draft graphical image O. Furthermore, in the finished graphical image P of the draft image direction setting screen 110b, the printed image area image Pb displays the image direction mark Pc indicating the image direction (landscape) similar to the direction of the image in the draft.

The horizontally disposed portrait key 112c is a key to be selected in a case where the direction of the image in the draft horizontally disposed in the ADF 31 is that of the portrait. The horizontally disposed portrait key 112c is constituted of an icon displaying a graphical image graphically showing a state in which the portrait draft is horizontally disposed in the ADF 31. Accordingly, it can easily and visually be recognized that the horizontally disposed portrait key 112c is a key (icon) for selecting "horizontally disposed, portrait" as the draft setting.

When the horizontally disposed portrait key 112c is touched, the draft (set in the ADF 31) is set to a "horizontally disposed, and portrait". In this case, the draft graphical image O displayed in the display area 72a indicates "draft size, horizontally disposed, and portrait".

For example, in the draft image direction setting screen 110c shown in FIG. 8, the horizontally disposed portrait key 112c is brought into the selected state. In this draft image direction setting screen 110c, the first display area 72a displays the draft graphical image O indicating "A4, horizontally disposed, and portrait", and the second display area 72b displays the finished graphical image P indicating "A4, horizontal, and portrait (corresponding to the draft)" and corresponding to the draft graphical image O. In the finished graphical image P of the draft image direction setting screen 110c, the printed image area image Pb displays the image direction mark Pc indicating an image direction (portrait) similar to the direction of the image in the draft.

The horizontally disposed landscape key 112d is a key to be selected in a case where the direction of the image in the draft horizontally disposed in the ADF 31 is that of the landscape. The horizontally disposed landscape key 112d is constituted of an icon displaying a graphical image graphically showing a state in which the landscape draft is horizontally disposed in the ADF 31. Accordingly, it can easily and visually be recognized that the horizontally disposed landscape key 112d is a key (icon) for selecting "horizontally disposed, landscape" as the draft setting.

When the horizontally disposed landscape key 112d is touched, the draft (set in the ADF 31) is set to "horizontally disposed, and landscape". In this case, the draft graphical image O displayed in the display area 72a indicates "draft size, horizontally disposed, and landscape".

For example, in the draft image direction setting screen 110d shown in FIG. 8, the horizontally disposed landscape key 112d is brought into the selected state. In this draft image direction setting screen 110d, the first display area 72a displays the draft graphical image O indicating "A4, horizontally disposed, and landscape", and the second display area 72b displays the finished graphical image P indicating "A4, horizontal, and landscape (corresponding to the draft)" and corresponding to the draft graphical image O. In the finished graphical image P of the draft direction setting screen 110d, the printed image area image Pb displays the image direction mark Pc indicating an image direction (landscape) similar to the direction of the image in the draft.

Moreover, as to the direction of the image in the draft, a default setting is stored in the default setting storage section 54a of the nonvolatile memory 54. In this default setting, the direction of the image in the draft is set to the portrait or the landscape. In a state in which the user does not designate any image direction, the image direction as the default setting is set to the direction of the image in the draft. In this case, the draft graphical image O displays the image direction mark Oc indicating the image direction of the default setting.

For example, in a case where the default setting of the direction of the image in the draft is the portrait, when the ADF draft size detecting function detects the vertically disposed draft, the draft setting is set to "vertically disposed, and portrait" based on the default setting. In this case, in the display section 22, there is displayed the draft image direction setting screen 110a in which the vertically disposed portrait key 112a is brought into the selected state. It is to be noted that in this case, in the draft image direction setting screen 110a, the vertically disposed landscape key 112b is displayed in a selectable state (state in which the key can be designated by the user), and the horizontally disposed portrait key 112c and the horizontally disposed landscape key 112d are displayed in a non-selectable state (whiteout).

Accordingly, the draft image direction setting screen 110a can indicate that the present draft setting is "vertically disposed, portrait" and that the draft setting can be changed to "vertically disposed, landscape" by the vertically disposed landscape key 112b. Furthermore, in the draft image direction setting screen 110a, the horizontally disposed portrait key 112c and the horizontally disposed landscape key 112d are displayed in the whiteout state. This can suggest that the direction of the draft set in the ADF 31 needs to be changed in order to change the setting to "horizontally disposed, portrait" or "horizontally disposed, landscape".

Moreover, in a case where the default setting of the direction of the image in the draft is the landscape, when the ADF draft size detecting function detects the vertically disposed draft, the draft setting is set to "vertically disposed, and landscape" based on the default setting. In this case, in the display section 22, there is displayed the draft image direction setting screen 110b in which the vertically disposed landscape key 112b is brought into the selected state. It is to be noted that in this case, in the draft image direction setting screen 110b, the vertically disposed portrait key 112a is displayed in the selectable state (state in which the key can be designated by the user), and the horizontally disposed portrait key 112c and the horizontally disposed landscape key 112d are displayed in the non-selectable state (whiteout).

Accordingly, the draft image direction setting screen 110b can indicate that the present draft setting is "vertically disposed, landscape" and that the draft setting can be changed to "vertically disposed, portrait" by the vertically disposed portrait key 112a. Furthermore, in the draft image direction setting screen 110b, the horizontally disposed portrait key 112c and the horizontally disposed landscape key 112d are displayed in the whiteout state. This can suggest that the direction of the draft set in the ADF 31 needs to be changed in order to change the setting to "horizontally disposed, portrait" or "horizontally disposed, landscape".

Moreover, in a case where the default setting of the direction of the image in the draft is the portrait, when the ADF draft size detecting function detects the horizontally disposed draft, the draft setting is set to "horizontally disposed, and portrait" based on the default setting. In this case, in the display section 22, there is displayed the draft image direction setting screen 110c in which the horizontally disposed portrait key 112c is brought into the selected state. It is to be noted that in this case, in the draft image direction setting screen 110c, the horizontally disposed landscape key 112d is displayed in a selectable state (state in which the key can be designated by the user), and the vertically disposed portrait key 112a and the vertically disposed landscape key 112b are displayed in the non-selectable state (whiteout).

Accordingly, the draft image direction setting screen 110c can indicate that the present draft setting is "horizontally disposed, portrait" and that the draft setting can be changed to "horizontally disposed, landscape" by the horizontally disposed landscape key 112d. Furthermore, in the draft image direction setting screen 110c, the vertically disposed portrait key 112a and the vertically disposed landscape key 112b are displayed in the whiteout state. This can suggest that the direction of the draft set in the ADF 31 needs to be changed in order to change the setting to "vertically disposed, portrait" or "vertically disposed, landscape".

Furthermore, in a case where the default setting of the direction of the image in the draft is the landscape, when the ADF draft size detecting function detects the horizontally disposed draft, the draft setting is set to "horizontally disposed, and landscape" based on the default setting. In this case, in the display section 22, there is displayed the draft image direction setting screen 110d in which the horizontally disposed landscape key 112d is brought into the selected state. In this case, in the draft image direction setting screen 110d, the horizontally disposed portrait key 112c is displayed in the selectable state (state in which the key can be designated by the user), and the vertically disposed portrait key 112a and the vertically disposed landscape key 112b are displayed in the non-selectable state (whiteout).

Accordingly, the draft image direction setting screen 110d can indicate that the present setting is "horizontally disposed, landscape" and that the draft setting can be changed to "horizontally disposed, portrait" by the horizontally disposed portrait key 112c. Furthermore, in the draft image direction setting screen 110d, the vertically disposed portrait key 112a and the vertically disposed landscape key 112b are displayed in the whiteout state. This can suggest that the direction of the draft set in the ADF 31 needs to be changed in order to change the setting to "vertically disposed, portrait" or "vertically disposed, landscape".

Next, there will be described a processing example of the draft set processing.

Here, as the processing example of the draft set processing, there will be described the draft set processing in a case where the ADF draft size detecting function is valid.

Figure 9:
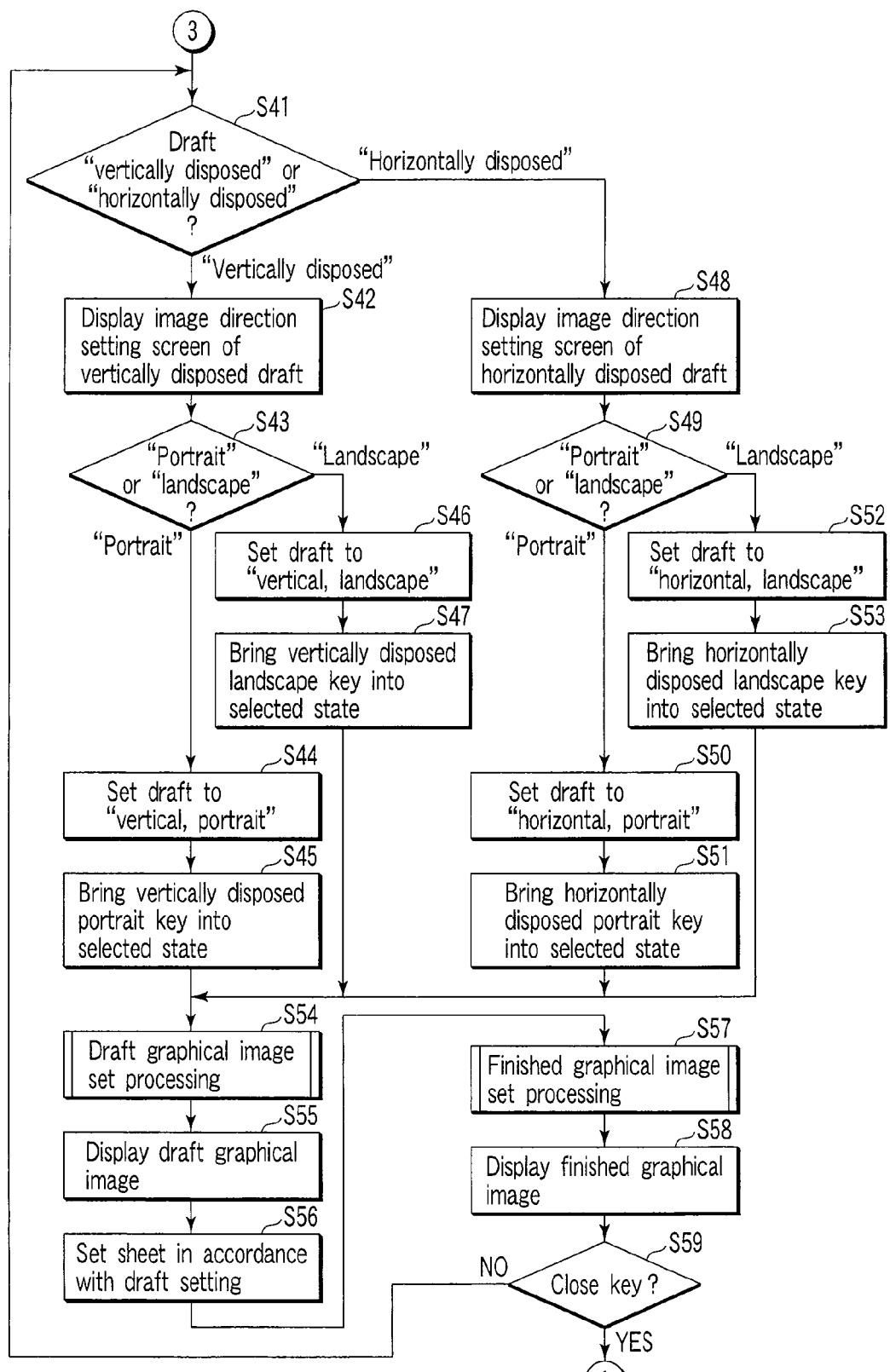
FIG. 9 is a flowchart showing a processing example of draft set processing.

FIG. 9 is a flowchart showing a processing example of the draft set processing in a state in which the draft setting screen (draft image direction setting screen) 110 shown in FIG. 7 or 8 is displayed.

When the draft setting key 87 is touched in the basic screen 70, the CPU 51 of the system control unit 11 performs the draft set processing in response to user's instruction. As described above, when the ADF draft size detecting function is valid, the CPU 51 selectively displays, in the display section 22, a draft image direction setting screen in accordance with a way to set the draft in the ADF 31, which is judged by the ADF draft size detecting function.

That is, in a case where the draft setting key 87 is touched by the user, when the ADF draft size detecting function detects the "vertically disposed" draft (step S41, vertically disposed), the CPU 51 displays, in the display section 22, the setting screen 110 (110a or 110b) for setting the direction of the image in the vertically disposed draft (step S42). In this case, the CPU 51 sets the direction of the image in the draft to that of the portrait or the landscape based on the default setting (steps S43 to S47).

For example, when the default setting is the portrait (step S43, portrait), the CPU 51 sets the draft setting to "draft size (draft size detected by the ADF draft size detecting function), vertical (draft setting direction detected by the ADF draft size detecting function), and portrait (direction of the image in the draft of the default setting)" (step S44). When the draft setting is "draft size, vertical, and portrait", the CPU 51 brings the vertically disposed portrait key 112a into the selected state in the draft image direction setting screen 110 as shown in the draft image direction setting screen 110a of FIG. 7 (step S45).

Moreover, in a case where the default setting is the landscape in a state in which the vertically disposed draft is detected (step S43, landscape), the CPU 51 sets the draft setting to "draft size (draft size detected by the ADF draft size detecting function), vertical (draft setting direction detected by the ADF draft size detecting function), and landscape (direction of the image in the draft of the default setting)" (step S46). When the draft setting is "draft size, vertical, and landscape", the CPU 51 brings the vertically disposed landscape key 112b into the selected state in the draft image direction setting screen 110 as shown in the draft image direction setting screen 110b of FIG. 7 (step S47).

Furthermore, in a case where the draft setting key 87 is touched by the user, when the ADF draft size detecting function detects the "horizontally disposed" draft (step S41, horizontally disposed), the CPU 51 displays, in the display section 22, the setting screen 110 (110c or 110d) for setting the direction of the image in the horizontally disposed draft (step S48). In this case, the CPU 51 sets the direction of the image in the draft to that of the portrait or the landscape based on the default setting (steps S49 to S53).

Here, when the default setting is the portrait (step S49, portrait), the CPU 51 sets the draft setting to "draft size (draft size detected by the ADF draft size detecting function), horizontal (draft setting direction detected by the ADF draft size detecting function), and portrait (direction of the image in the draft of the default setting)" (step S50). When the draft setting is "draft size, horizontal, and portrait", the CPU 51 brings the horizontally disposed portrait key 112c into the selected state in the draft image direction setting screen 110 as shown in the image direction setting screen 110c of FIG. 8 (step S51).

Moreover, in a case where the default setting is the landscape in a state in which the horizontally disposed draft is detected (step S49, landscape), the CPU 51 sets the draft setting to "draft size (draft size detected by the ADF draft size detecting function), horizontal (draft setting direction detected by the ADF draft size detecting function), and landscape (direction of the image in the draft of the default setting)" (step S52). When the draft setting is "draft size, horizontal, and landscape", the CPU 51 brings the horizontally disposed landscape key 112d into the selected state in the horizontally disposed draft image direction setting screen 110 as shown in the image direction setting screen 110d of FIG. 8 (step S53).

According to the above-described processing, when the draft setting key 87 is touched, the CPU 51 displays the draft image direction setting screen in the display section 22 based on the detection result of the ADF draft size detecting function and the default setting.

Moreover, in a state in which the draft image direction setting screen 110 is displayed, the CPU 51 constantly detects the draft in the ADF 31 by the ADF draft size detecting function. That is, in a case where the direction of the draft set in the ADF 31 is changed in a state in which the draft image direction setting screen 110 is displayed, the CPU 51 detects that the direction of the draft set in the ADF 31 has been changed by the ADF draft size detecting function. In a case where the ADF draft size detecting function judges that the direction of the draft set in the ADF 31 has been changed, the CPU 51 switches the display to the draft image direction setting screen 110 in accordance with the draft setting direction.

For example, when the vertically disposed draft is changed to the horizontally disposed draft, the CPU 51 detects that the direction of the draft set in the ADF 31 has been changed to that of the "horizontally disposed" draft by the ADF draft size detecting function (step S41, horizontally disposed). In this case, the CPU 51 changes the vertically disposed draft image direction setting screen 110a or 110b shown in FIG. 7 to the horizontally disposed draft image direction setting screen 110c or 110d shown in FIG. 8 (step S48).

Moreover, when the horizontally disposed draft is changed to the vertically disposed draft, the CPU 51 detects that the direction of the draft set in the ADF has been changed to that of the "vertically disposed" draft by the ADF draft size detecting function (step S41, vertically disposed). In this case, the CPU 51 changes the horizontally disposed draft image direction setting screen 110c or 110d shown in FIG. 8 to the horizontally disposed draft image direction setting screen 110a or 110b shown in FIG. 7 (step S42).

Furthermore, in the state in which the draft image direction setting screen 110 is displayed, the CPU 51 sets the direction of the image in the draft in response to the key touched by the user (steps S44, S46, S50, and S52).

In addition, in the state in which the draft image direction setting screen 110 is displayed, the CPU 51 sets the direction of the image in the draft in response to the key touched by the user (step S44).

For example, in a case where the user touches the vertically disposed portrait key 112a in the vertically disposed draft image direction setting screen 110b shown in FIG. 7 (step S43, portrait), the CPU 51 sets the direction of the image in the draft to that of the portrait (step S44). In this case, the CPU 51 brings the vertically disposed portrait key 112a into the selected state as shown in the vertically disposed draft image direction setting screen 110a of FIG. 7 (step S45).

Moreover, in a case where the user touches the vertically disposed landscape key 112b in the vertically disposed draft image direction setting screen 110b shown in FIG. 7 (step S43, landscape), the CPU 51 sets the direction of the image in the draft to that of the landscape (step S46). In this case, the CPU 51 brings the vertically disposed landscape key 112b into the selected state as shown in the vertically disposed draft image direction setting screen 110b of FIG. 7 (step S47).

Furthermore, in a case where the user touches the horizontally disposed portrait key 112c in the horizontally disposed draft image direction setting screen 110d shown in FIG. 8 (step S49, portrait), the CPU 51 sets the direction of the image in the draft to that of the portrait (step S50). In this case, the CPU 51 brings the horizontally disposed portrait key 112c into the selected state as shown in the horizontally disposed draft image direction setting screen 110c of FIG. 8 (step S51).

In addition, in a case where the user touches the horizontally disposed landscape key 112d in the horizontally disposed draft image direction setting screen 110c shown in FIG. 8 (step S49, landscape), the CPU 51 sets the direction of the image in the draft to that of the landscape (step S52). In this case, the CPU 51 brings the horizontally disposed landscape key 112d into the selected state as shown in the horizontally disposed draft image direction setting screen 110d of FIG. 8 (step S53).

When the above steps S44, S46, S50 and S52 change draft setting such as the draft setting direction or the direction of the image in the draft, the CPU 51 performs the draft graphical image set processing to set the graphical image corresponding to the present draft setting (step S54).

In this draft graphical image set processing, there is set the draft graphical image O indicating the draft size, the draft setting direction and the direction of the image in the draft. Especially, here, to indicate the direction of the image in the draft, there is set the draft graphical image O in which the mark Oc of the direction of the image in the draft is superimposed on the draft image area image Ob. It is to be noted that the draft graphical image set processing will be described later in detail.

When the draft graphical image set processing sets the draft graphical image, the CPU 51 displays the set draft graphical image O in the first display area 72a (step S55).

For example, in a case where "vertical, portrait" is set as the draft setting in the step S44, the CPU 51 sets the graphical image indicating at least "draft size, vertical, and portrait" as the draft graphical image O, and displays the image in the first display area 72a. In a case where "vertical, landscape" is set as the draft setting in the step S46, the CPU 51 sets the graphical image indicating at least "draft size, vertical, and landscape" as the draft graphical image O, and displays the image in the first display area 72a.

Moreover, in a case where "horizontal, portrait" is set as the draft setting in the step S50, the CPU 51 sets the graphical image indicating at least "draft size, horizontal, and portrait" as the draft graphical image O, and displays the image in the first display area 72a. In a case where "horizontal, landscape" is set as the draft setting in the step S52, the CPU 51 sets the graphical image indicating at least "draft size, horizontal, and landscape" as the draft graphical image O, and displays the image in the first display area 72a.

When the draft setting is changed in the step S44, S46, S50 or S52, the CPU 51 also changes the sheet setting in accordance with the change of the draft setting (step S56). For example, when the draft setting direction (vertically or horizontally disposed) is changed, an area of the sheet to be printed is changed as the sheet setting. This is reflected in the printed image area image of the finished graphical image P. In a case where the direction of the image in the draft (portrait or landscape) is changed, as the sheet setting, the direction of the printed image is changed to a direction corresponding to the direction of the draft image (portrait or landscape), which is set contents to be reflected in the printed image direction mark Pc of the finished graphical image P.

When the sheet setting is changed in accordance with the change of the draft setting, the CPU 51 sets the finished graphical image (step S57). In this finished graphical image set processing, there is set the finished graphical image P indicating the sheet size, the sheet direction and the direction of the image to be printed on the sheet. Especially, to indicate the direction of the image to be printed on the sheet, there is set the finished graphical image P in which the mark Pc of the direction of the image in the sheet is superimposed on the printed image area image Pb. It is to be noted that the finished graphical image set processing will be described later in detail.

When the finished graphical image P is set by this finished graphical image set processing, the CPU 51 displays the set finished graphical image P in the second display area 72b (step S58).

The processing of the steps S41 to S58 is executed until the close key 113 is touched. That is, when the user touches the close key 113 (step S59, YES), the CPU 51 closes the draft image direction setting screen 110 (110a, 110b, 110c and 110d), and displays, in the display section 22, the basic screen 70b in which the present set contents are reflected.

Next, there will be described the set processing of the draft graphical image O and that of the finished graphical image P.

First, there will be described the draft graphical image set processing.

Figure 10:
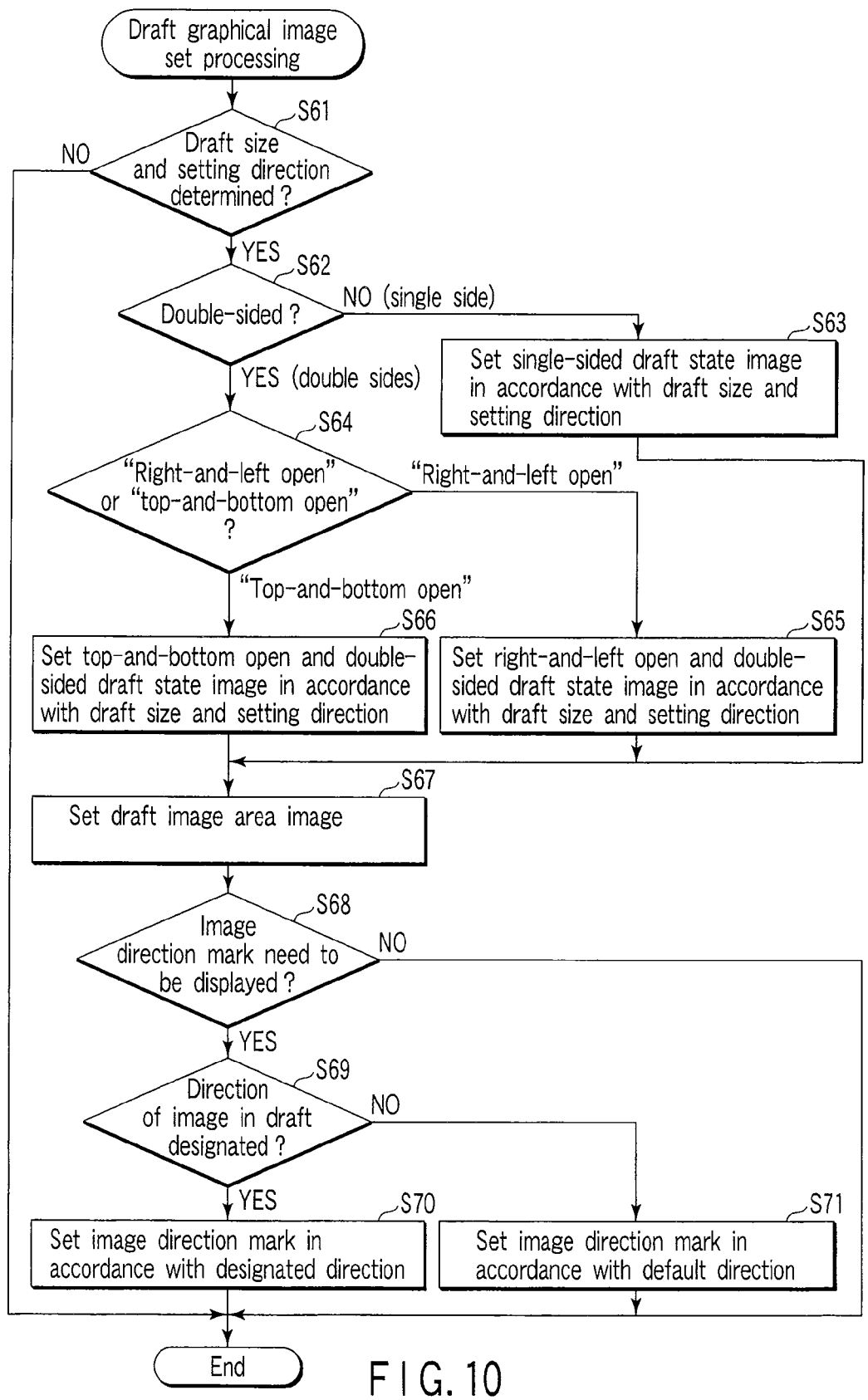
FIG. 10 is a flowchart showing a processing example of draft graphical image set processing.

FIG. 10 is a flowchart showing a processing example of the set processing of the draft graphical image O.

When the draft setting is changed by the various types of set processing as described above, the CPU 51 judges whether or not the draft size and the draft direction (setting direction) are determined (step S61). In a case where this judgment results in judgment that the draft size and the draft setting direction are not determined (step S61, NO), the CPU 51 assumes that the draft graphical image is displayed in the whiteout state (thinly displayed state) in the first display area 72a. For example, since the draft size and the draft setting direction are not determined in a standby state, as shown in the basic screen 70a of FIG. 4, the CPU 51 sets the draft graphical image O so that the draft state image Oa of the default setting is displayed in the whiteout state.

In a case where it is judged that the draft size and the draft setting direction are determined (step S61, YES), the CPU 51 sets the draft state image Oa (steps S61 to S66).

That is, in a case where it is judged that the draft size and the draft setting direction are determined (step S61, YES), the CPU 51 judges whether or not the draft is set to be double-sided (step S62). In a case where it is judged that the draft is not set to be double-sided, that is, it is judged that the draft is set to be single-sided (step S62, NO), the CPU 51 sets the single-sided graphical image as the draft state image Oa in accordance with the draft size and setting direction (step S63).

Moreover, in a case where it is judged that the draft is set to be double-sided (step S62, YES), the CPU 51 judges whether the open direction of the double-sided draft is set to be "right-and-left open" or "top-and-bottom open" (step S64).

It is to be noted that the "right-and-left open" indicates a draft (or sheet) which opens to the left or right with respect to the direction of the image in the surface of the draft (or sheet). That is, in the "right-and-left open", when the draft (or sheet) opens to the left or right with respect to the direction of the image in the surface of the draft, the direction of the image in the surface of the draft (or sheet) becomes the same as that of the image in the back surface.

Moreover, the "top-and-bottom open" indicates a draft (or sheet) which opens vertically with respect to the direction of the image in the surface of the draft (or sheet). That is, in the "top-and-bottom open", when the draft (or sheet) opens upwards or downwards with respect to the direction of the image in the surface of the draft, the direction of the image in the surface of the draft (or sheet) becomes the same as that of the image in the back surface.

When the open direction of the double-sided draft is set to be "right-and-left open" (step S64, "right-and-left open"), the CPU 51 sets a right-and-left open and double-sided graphical image as the draft state image Oa in accordance with the draft size and the setting direction (step S65).

When the open direction of the double-sided draft is set to the top-and-bottom open direction (step S64, "top-and-bottom open"), the CPU 51 sets the top-and-bottom open and double-sided graphical image as the draft state image Oa in accordance with the draft size and setting direction (step S66).

Here, it is assumed that various graphical images settable (displayable) as the draft state image Oa are stored beforehand in a storage section such as the HDD 55, the nonvolatile memory 54 or the ROM 53. For example, a storage section such as the HDD 55, the nonvolatile memory 54 or the ROM 53 may store beforehand: single-sided graphical images having various sizes and directions; right-and-left open and double-sided graphical images having various sizes and directions; top-and-bottom open and double-sided graphical images having various sizes and directions and the like.

Therefore, in the step S63, the CPU 51 selects, from various single-sided graphical images, the single-sided graphical image having the size and direction matched with the draft size and setting direction. In the step S65, the CPU 51 selects, from various right-and-left open and double-sided graphical images, the right-and-left open and double-sided graphical image having the size and direction matched with the draft size and setting direction. In the step S66, the CPU 51 selects, from various top-and-bottom open and double-sided graphical images, the top-and-bottom open and double-sided graphical image having the size and direction matched with the draft size and setting direction.

The CPU 51 may select, as the draft state image Oa, the graphical image having the size associated with a certain draft size (e.g., A3, A4, B4, . . . ). Moreover, the CPU 51 rotates the selected graphical image in accordance with the draft setting direction to thereby set the draft state image Oa. It is to be noted that the CPU 51 may determine the size of the graphical image selected as the draft state image Oa based on a relative draft size (photocopy magnification) with respect to the sheet size.

On setting the draft state image Oa, the CPU 51 sets the draft image area image Ob (step S67). Here, it is assumed that the CPU 51 superimposes (synthesizes) the draft image area image Ob on the set draft state image Oa. A draft area which is valid as the image is usually a predetermined area of the whole draft. Therefore, the draft image area image Ob is set to the predetermined area with respect to the draft state image Oa.

Moreover, the draft image area image Ob may be synthesized with the draft state image Oa beforehand. In this case, a storage section such as the HDD 55, the nonvolatile memory 54 or the ROM 53 may store beforehand a graphical image in which the draft image area image Ob is synthesized with the draft state image Oa. In this case, it is assumed that the CPU 51 sets the graphical image from the graphical image in which the draft state image Oa is synthesized with the draft image area image Ob in accordance with the draft setting.

On setting the draft image area image Ob, the CPU 51 judges whether or not the draft graphical image O needs to display the draft image direction mark Oc indicating the direction of the image in the draft (step S68). Here, the CPU 51 judges whether or not it is necessary to display the draft image direction mark Oc based on the present set contents.

For example, in the photocopy only for setting the magnification or the sheet, even unless the direction of the image in the draft is considered, the finish is little influenced. In such case, the user does not have to be aware of the direction of the image in the draft. Furthermore, when the draft image direction mark Oc is displayed in such case, the user becomes aware of the direction of the image in the draft more than necessary.

Therefore, in a case where the magnification or the sheet is set, that is, in such set contents that the finish is not influenced by the direction of the image in the draft (in a case where the finish is unchanged if the direction of the image in the draft is a direction of "portrait" or "landscape"), the CPU 51 judges that the draft image direction mark Oc does not have to be displayed.

On the other hand, when there is set double-sided photocopy, a finishing function such as staple setting, Nin1 photocopy, a certain application setting settable from the application setting menu or the like, the finish is largely influenced by the direction of the image in the draft. In such case, the user needs to be aware of the direction of the image in the draft in order to set the photocopy as desired. In other words, the digital multifunction peripherals needs to allow the user to recognize the direction of the image in the draft in order to perform the setting as intended by the user.

Therefore, in a case where there is set the double-sided setting, finishing function setting, Nin1 setting, application setting or the like, that is, the direction of the image in the draft indicates the set contents which influence the finish (in a case where the finish changes depending on whether the direction of the image in the draft is that of "portrait" or "landscape"), the CPU 51 judges that it is necessary to display the draft image direction mark Oc.

When it is judged in the step S68 that the draft image direction mark Oc does not have to be displayed (step S68, NO), the CPU 51 ends the draft graphical image set processing. In this case, since the draft image direction mark Oc is not set, there is set the draft graphical image O constituted of the draft state image Oa and the draft image area image Ob.

Moreover, in a case where it is judged in the step S68 that the draft image direction mark Oc needs to be displayed (step S68, YES), the CPU 51 sets the image direction mark Oc indicating the direction of the image in the draft (steps S69 to S71).

For example, in a case where the draft image direction is designated by the user (step S69, YES), the CPU 51 sets the image direction mark Oc in accordance with the image direction designated by the user (step S70). That is, when the user designates the direction of the image in the draft, the image direction mark Oc is set so that the mark is superimposed on the draft image area image Ob in the image direction designated by the user.

Moreover, in a case where the user does not designate the direction of the image in the draft (step S69, YES), the CPU 51 sets the image direction mark Oc in accordance with the image direction set based on the default setting (step S71). That is, in a case where the user does not designate the direction of the image in the draft, the image direction mark Oc is set so that the mark is superimposed on the draft image area image Ob in the image direction of the default setting.

It is to be noted that as the image direction mark Oc, there is used an image such as a character or a symbol whose direction can easily and visually be recognized. It is assumed that an image such as the character or the symbol for use as the image direction mark Oc is stored beforehand in a storage section such as the HDD 55, the nonvolatile memory 54 or the ROM 53.

Moreover, the draft image area image Ob and the image direction mark Oc may be synthesized beforehand. In this case, a storage section such as the HDD 55, the nonvolatile memory 54 or the ROM 53 may store beforehand various graphical images in which the draft image area images Ob are synthesized with the image direction marks Oc, respectively. In this case, the CPU 51 sets the graphical image in accordance with the draft setting (draft size, draft setting direction and image direction) from various graphical images in which the draft image area images Ob are synthesized with the image direction marks Oc.

The above-described processing sets the draft graphical image O in which the present set contents are reflected every time the set contents are changed. In other words, the draft graphical image O set by such set processing is displayed in the first display area 72*a* every time the set contents of the photocopy processing are changed.

Next, there will be described the set processing of the finished graphical image P.

Figure 11:
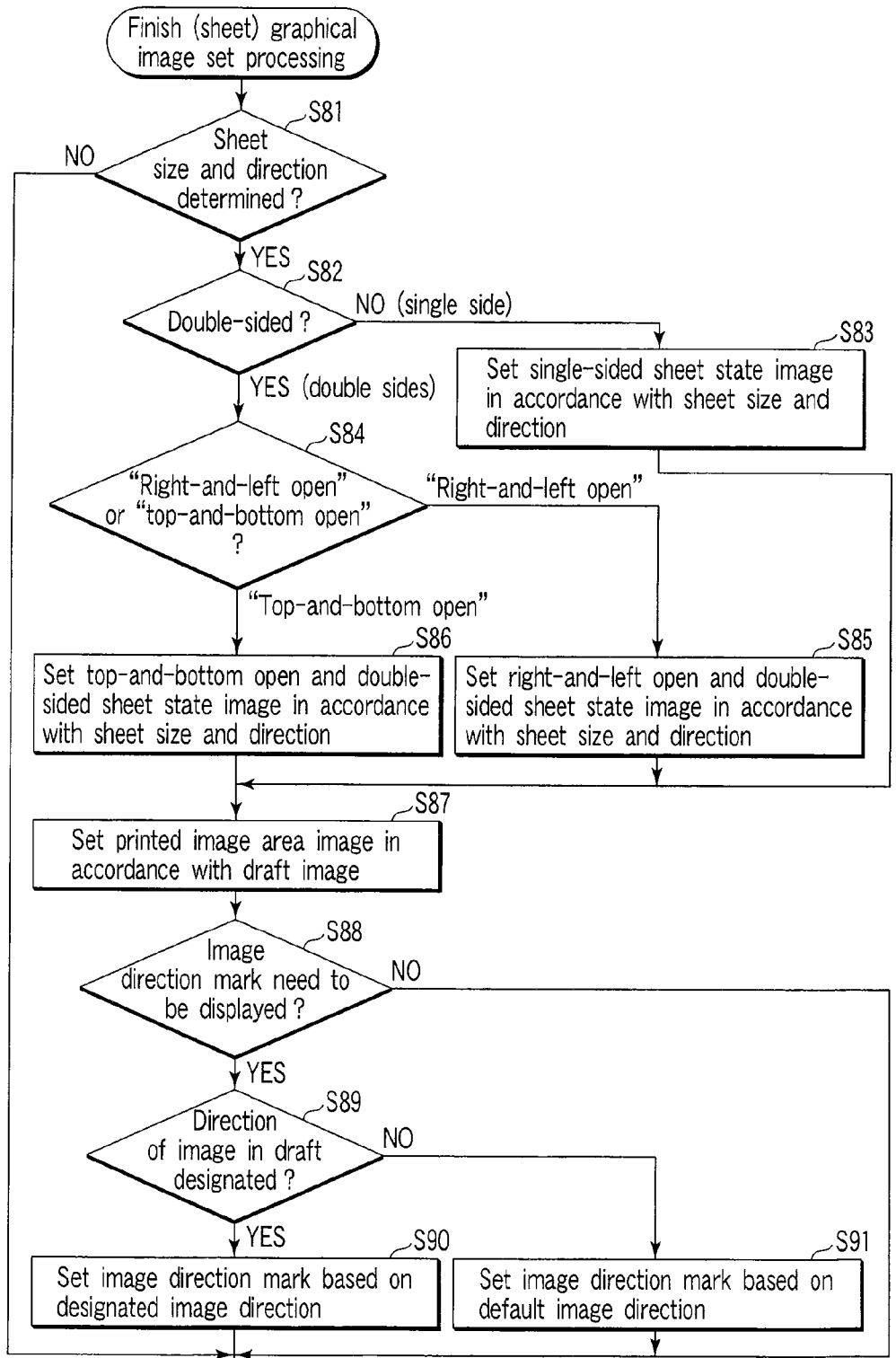
FIG. 11 is a flowchart showing a processing example of finished graphical image set processing.

FIG. 11 is a flowchart showing a processing example of the set processing of the finished graphical image P.

When the sheet setting is changed by the various types of set processing as described above, the CPU 51 judges whether or not the sheet size and the sheet direction are determined (step S81). In a case where this judgment results in judgment that the sheet size and the sheet direction are not determined (step S81, NO), the CPU 51 assumes that the finished graphical image is displayed in the whiteout state (thinly displayed state) in the second display area 72*b* in the same manner as in the draft graphical image. For example, since the sheet size and the sheet direction are not determined in a standby state as shown in the basic screen 70*a* of FIG. 4, the CPU 51 sets the finished graphical image P so that the only sheet state image Pa of the default setting is displayed in the whiteout state.

In a case where it is judged that the sheet size and the sheet direction are determined (step S81, YES), the CPU 51 sets the sheet state image Pa indicating a sheet state such as the sheet size, the sheet direction or the surface to be printed (single-sided or double-sided) (steps S81 to S85).

That is, in a case where it is judged that the sheet size and the sheet direction are determined (step S81, YES), the CPU 51 judges whether or not the sheet is set to be double-sided (step S82). In a case where it is judged that the sheet is not set to be double-sided, that is, it is judged that the sheet is set to be single-sided (step S82, NO), the CPU 51 sets the single-sided graphical image as the sheet state image Pa in accordance with the sheet size and the sheet direction (step S83).

Moreover, in a case where it is judged that the sheet is set to be double-sided (step S82, YES), the CPU 51 judges whether the open direction of the double-sided sheet is set to be "right-and-left open" or "top-and-bottom open" (step S84). When the open direction of the double-sided sheet is set to be "right-and-left open" (step S84, "right-and-left open"), the CPU 51 sets a right-and-left open and double-sided graphical image as the sheet state image Pa in accordance with the sheet size and the sheet direction (step S85). When the open direction of the double-sided sheet is set to the top-and-bottom open direction (step S84, "top-and-bottom open"), the CPU 51 sets the top-and-bottom open and double-sided graphical image as the sheet state image Pa in accordance with the sheet size and sheet direction (step S86).

Here, it is assumed that various graphical images settable (displayable) as the sheet state image Pa are stored beforehand in a storage section such as the HDD 55, the nonvolatile memory 54 or the ROM 53. For example, a storage section such as the HDD 55, the nonvolatile memory 54 or the ROM 53 may store beforehand: single-sided graphical images having various sizes and directions; right-and-left open and double-sided graphical images having various sizes and directions; top-and-bottom open and double-sided graphical images having various sizes and directions and the like.

Therefore, in the step S83, the CPU 51 selects, from the single-sided graphical images having various sizes, the single-sided graphical image having the size matched with the sheet size and direction. In the step S85, the CPU 51 selects, from right-and-left open and double-sided graphical images having various sizes, the right-and-left open and double-sided graphical image having the size matched with the sheet size and direction. In the step S86, the CPU 51 selects, from top-and-bottom open and double-sided graphical images having various sizes, the top-and-bottom open and double-sided graphical image having the size matched with the sheet size and direction.

Moreover, the CPU 51 may determine the size of the graphical image selected as the sheet state image Pa based on a relative sheet size with respect to the draft size. The CPU 51 may rotate the graphical image matched with the sheet size in accordance with the sheet direction to thereby set the image as the sheet state image Pa. It is to be noted that the CPU 51 may select, as the sheet state image Pa, the graphical image having a size associated with the sheet size (e.g., A3, A4, B4, . . . ).

On setting the sheet state image Pa, the CPU 51 sets the printed image area image Pb (step S87). In this step S87, the CPU 51 superimposes (synthesizes) the printed image area image Pb on the set sheet state image Pa. That is, the CPU 51 sets, as the printed image area image Pb, an image showing a printed image generated based on set contents such as the draft image and photocopy magnification. The CPU 51 superimposes the printed image area image on the sheet state image Pa in accordance with a position of the sheet to be printed. For example, in a case where a printing start position is the upper left of the sheet, the CPU 51 aligns an upper left position of the printed image area image Pb with the upper left position of the sheet state image Pa which is a reference, and superimposes the printed image area image Pb on the sheet state image Pa.

On setting the printed image area image Pb, the CPU 51 judges whether or not the image direction mark Pc indicating the direction of the image in the sheet needs to be displayed in the finished graphical image P (step S88). This judgment is similar to that of the step S68.

When it is judged in the step S88 that the printed image direction mark Pc does not have to be displayed (step S88, NO), the CPU 51 ends the finished graphical image set processing. In this case, since the printed image direction mark Pc is not set, there is set the finished graphical image P constituted of the sheet state image Pa and the printed image area image Pb.

Moreover, in a case where it is judged in the step S88 that the printed image direction mark Pc needs to be displayed (step S88, YES), the CPU 51 sets the printed image direction mark Pc indicating the direction of the image in the sheet (steps S89 to S91). The direction of the image to be printed on the sheet depends on the direction of the image in the draft. Therefore, the printed image direction mark Pc is set to an image direction corresponding to the direction of the image in the draft.

For example, in a case where the draft image direction is designated by the user (step S89, YES), the CPU 51 sets the printed image direction mark Pc in accordance with the direction of the image in the draft, designated by the user (step S90). That is, when the user designates the direction of the image in the draft, the printed image direction mark Pc is set so that the mark is superimposed on the printed image area image Pb in accordance with the direction of the image in the draft, designated by the user.

Moreover, in a case where the user does not designate the direction of the image in the draft (step S69, YES), the CPU 51 sets the printed image direction mark Pc in accordance with the direction of the image in the draft, set based on the default setting (step S91). That is, in a case where the user does not designate the direction of the image in the draft, the printed image direction mark Pc is set so that the mark is superimposed on the printed image area image Pb in accordance with the direction of the image in the draft of the default setting.

It is to be noted that as the printed image direction mark Pc, there is used an image such as a character or a symbol whose direction can easily and visually be recognized in the same manner as in the draft image direction mark Oc. An image such as the character or the symbol for use as the printed image direction mark Pc is stored beforehand in a storage section such as the HDD 55, the nonvolatile memory 54 or the ROM 53.

The above-described processing sets the finished graphical image P in which the present set contents are reflected every time the set contents are changed. In other words, the finished graphical image P set by such set processing is displayed in the second display area 72b every time the set contents of the photocopy processing are changed.

Accordingly, the user can visually and intuitively recognize a state (finished state) in which the image is printed on the sheet in accordance with the draft state. As a result, a mistake is not easily generated in a photocopy operation, and it is possible to prevent an output of a photocopy result which is different from that intended by the user.

Next, there will be described setting and display processing of the image direction marks Oc and Pc in various setting screens.

As described above, it is preferable to display the image direction mark Oc of the draft graphical image O and the image direction mark Pc of the finished graphical image P in accordance with the present setting situation. Especially in such set contents that the finish is influenced by the setting of the direction of the image in the draft (such set contents that the finish changes if the direction of the image in the draft is changed), it is preferable that the user precisely recognizes the set state of the direction of the image in the draft.

Therefore, in a case where the image direction marks Oc and Pc are set to such set contents that the image direction setting influences the finish, the marks are displayed in the draft graphical image O and the finished graphical image P, respectively. In a case where the marks are set to such set contents that the setting of the image direction does not influence the finish, the marks are not displayed in the draft graphical image O and the finished graphical image P.

For example, in the setting of the Nin1 photocopy, the setting of the image direction influences the finish. In the setting of the Nin1 photocopy, it is not easy for the user to image a relation between the direction of the image in the draft and a plurality of image directions of the finish. Therefore, in the Nin1 photocopy setting screen displayed in a case where the Nin1 key 85 is touched in the basic screen 70, it is preferable that the draft graphical image O displays the image direction mark Oc indicating the direction of the image in the draft, and the finished graphical image P displays the image direction mark Pc indicating the direction of each image to be printed on the sheet.

Moreover, when the double-sided draft or the open direction of the double-sided draft is set, the setting of the image direction influences the finish in many cases. Therefore, in a setting screen of the double-sided setting or the open direction of the double-sided draft, which is to be displayed in a case where the photocopy side (single-sided/double-sided) key 83 is touched in the basic screen 70, the draft graphical image O displays the image direction mark Oc indicating the direction of the image in the draft, and the finished graphical image P displays the image direction mark Pc indicating the direction of each image to be printed on the sheet.

Furthermore, when a finishing function such as stapling is set, the setting of the image direction influences the finish in many cases. Therefore, in a setting screen of a finishing function such as the stapling, which is to be displayed in a case where the finishing setting key 84 is touched in the basic screen 70, the draft graphical image O displays the image direction mark Oc indicating the direction of the image in the draft, and the finished graphical image P displays the image direction mark Pc indicating the direction of each image to be printed on the sheet.

In addition, in the application setting, the setting of the image direction influences the finish in many cases. When the application setting key 86 is touched in the basic screen 70, an application menu is displayed. From the menu, there is performed an application setting such as a binding margin setting, a border erase setting, a booklet center joint elimination setting, a continuous page photocopy setting, a magazine sorting (bookbinding mode) setting, a mirror image setting, a negative/positive reverse setting, an independent scaling setting, a date and time addition setting or a page addition setting. Even in such screen, the draft graphical image O displays the image direction mark Oc indicating the direction of the image in the draft, and the finished graphical image P displays the image direction mark Pc indicating the direction of each image to be printed on the sheet.

Therefore, the operation panel 12 of the present digital multifunction peripherals selectively displays the image direction mark Oc of the draft graphical image O and the image direction mark Pc of the finished graphical image P in accordance with the present set situation. Such setting and display processing of the image direction marks Oc and Pc will be described.

Figure 12:
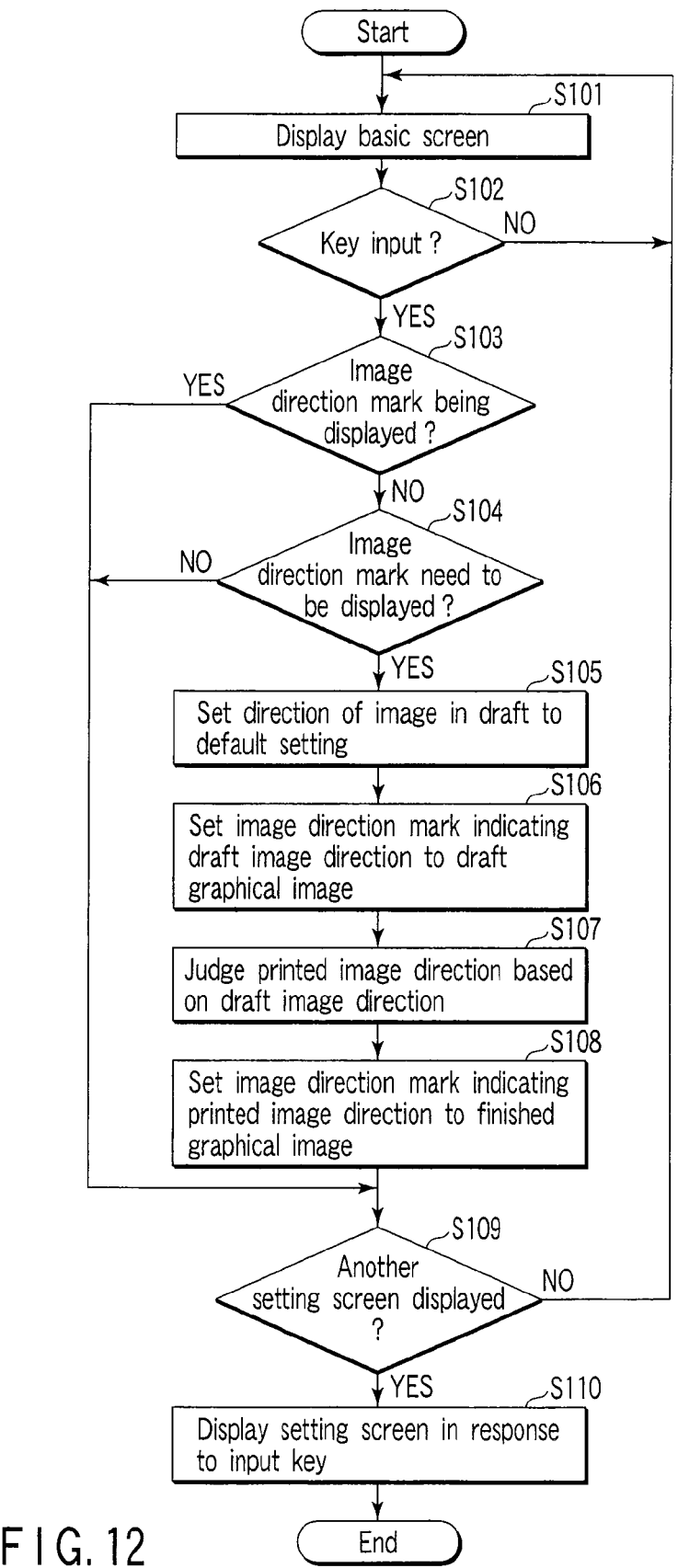
FIG. 12 is a flowchart showing processing to set an image direction mark in response to a key input.

FIG. 12 is a flowchart showing the setting and display processing of the image direction mark Oc of the draft graphical image O and the image direction mark Pc of the finished graphical image P.

First, it is assumed that the basic screen 70 is displayed in the display section 22 of the operation panel 12 (step S101). In this state, in a case where there is detected an input to the hardware key 21 of the operation panel 12 or any key displayed in the display section 22 (step S102, YES), the CPU 51 judges whether or not the image direction marks Oc and Pc are already displayed (set) (step S103).

In a case where this judgment judges a state in which the image direction mark Oc or Pc is not displayed (step S103, YES), the CPU 51 judges whether or not the image direction marks Oc and Pc need to be displayed (set) (step S104). This judges whether or not it is necessary for the user to recognize the set state of the image direction in response to the input key.

In a case where the key is input to perform such setting that the setting of the direction of the image in the draft does not influence the finish, that is, the key is input to perform such setting that the finish does not change even if the direction of the image in the draft is that of the portrait or the landscape, the CPU 51 judges that the image direction mark Oc or Pc does not have to be displayed (set).

For example, in the basic screen 70, when the magnification key 81, the sheet key 82, the store key 88, the setting check key 89, the color setting key 90, the image adjustment key 91, the draft mode key 92, the density adjustment key 93 or the like is touched, the CPU 51 judges that the image direction marks Oc and Pc do not have to be displayed (set).

Conversely, in a case where the key is input to perform such setting that the direction of the image in the draft influences the finish, that is, the key is input to perform such setting that the finish changes in accordance with whether the direction of the image in the draft is that of the portrait or the landscape, the CPU 51 judges that the image direction marks Oc and Pc need to be displayed (set).

For example, in the basic screen 70, when the single-sided/double-sided key 83, the finishing setting key 84, the Nin1 key 85, the application setting key 86, the draft setting key 87 or the like is touched, the CPU 51 judges that the image direction marks Oc and Pc need to be displayed (set).

As described above, in the step S104, for example, there may be set beforehand a key which needs to display the image direction marks Oc and Pc, and it may be judged whether or not the key has been input. It is to be noted that similar processing may be performed even in a case where a setting screen other than the basic screen 70 is displayed.

In a case where the judgment judges that the image direction mark needs to be displayed (step S104, YES), the CPU 51 sets the image direction as the present set contents based on the default setting stored in the default setting storage section 54*a* of the nonvolatile memory 54 (step S105).

When the image direction is set based on the default setting, the CPU 51 superimposes the image direction mark Oc corresponding to the image direction on the draft image area image Ob to thereby set the draft graphical image O synthesized with the image direction mark Oc (step S106).

Furthermore, on setting the image direction based on the default setting, the CPU 51 judges the direction of the image to be printed on the sheet in accordance with the draft image direction (step S107). Based on this judgment, the CPU 51 superimposes, on the printed image area image Pb, the image direction mark Pc indicating the direction of the image to be printed on the sheet to thereby set the finished graphical image P synthesized with the image direction mark Pc (step S108).

The above-described processing displays the image direction mark Oc in the draft graphical image O and the image direction mark Pc in the finished graphical image P, in a case where the image direction mark needs to be displayed.

Moreover, the CPU 51 judges whether or not the display screen of the display section 22 is to shift from the basic screen to another setting screen in response to the input key (step S109). In a case where the basic screen does not shift to the other setting screen (step S109, NO), the CPU 51 performs the setting in response to the key input in a state in which the basic screen 70 is displayed.

In this case, if the image direction mark is set in the steps S106 and S108, the CPU 51 displays the draft graphical image in which the image direction mark Oc is set in the first display area 72*a* of the basic screen 70, and displays the finished graphical image in which the image direction mark Pc is set in the second display area 72*b*.

Moreover, in a case where it is judged that the basic screen shifts to the other setting screen (step S109, YES), the CPU 51 displays the setting screen in the display section 22 in response to the input key (step S110). In this case, if the image direction mark is set in the steps S106 and S108, the CPU 51 displays the draft graphical image in which the image direction mark Oc is set, and displays the finished graphical image in which the image direction mark Pc is set in the setting screen corresponding to the input key.

Accordingly, in a case where, for example, the single-sided/double-sided key 83, the finishing setting key 84, the Nin1 key 85, the application setting key 86, the draft setting key 87 or the like is touched in the basic screen 70, the CPU 51 displays the setting screen in response to the input key, and displays the image direction marks Oc and Pc in the draft graphical image O and the finished graphical image P in the setting screen, respectively. The marks have been set based on the image direction of the default setting.

Figure 13:
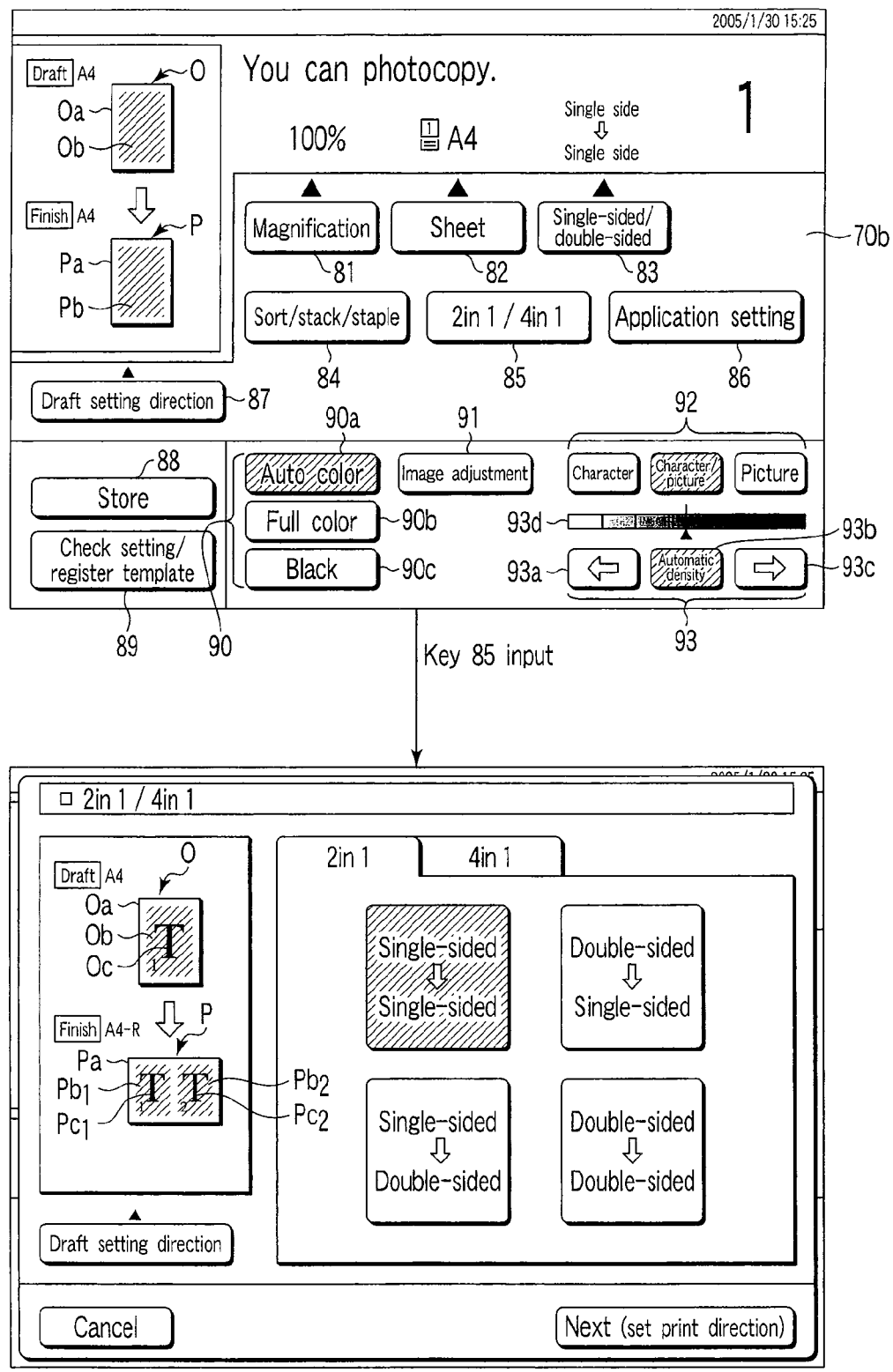
FIG. 13 is a diagram showing a display example in a case where the basic screen shifts to an Nin1 photocopy setting screen.

FIG. 13 is a diagram showing a transition example of the display screen in a case where the Nin1 key 85 is touched in the basic screen 70b in which the image direction marks Oc and Pc are not displayed. As shown in FIG. 13, in a case where the Nin1 key 85 is touched in the basic screen 70b in which the image direction marks Oc and Pc are not displayed, the display section 22 displays the Nin1 photocopy setting screen in which the draft graphical image O and the finished graphical image P are displayed in which there are set the image direction marks Oc and Pc set based on the image direction of the default setting.

Next, there will be described a function of leaning the default setting of the image direction.

As described above, the default setting of the direction of the image in the draft is stored in the default setting storage section 54a of the nonvolatile memory 54. The default setting of the image direction is stored beforehand in the default setting storage section. It might be preferable that different default settings are stored depending on user's use situation.

For example, even in a case where the image direction is set to that of the portrait as the default setting, a setting frequency of the landscape is sometimes higher than that of the portrait depending on the use situation of the digital multifunction peripherals. In this case, operability of the digital multifunction peripherals is improved in a case where the default setting is the landscape.

Therefore, the present digital multifunction peripherals has a function (learning function) of setting the image direction having a high setting frequency as a default based on the setting of the image direction in the executed photocopy processing.

Figure 14:
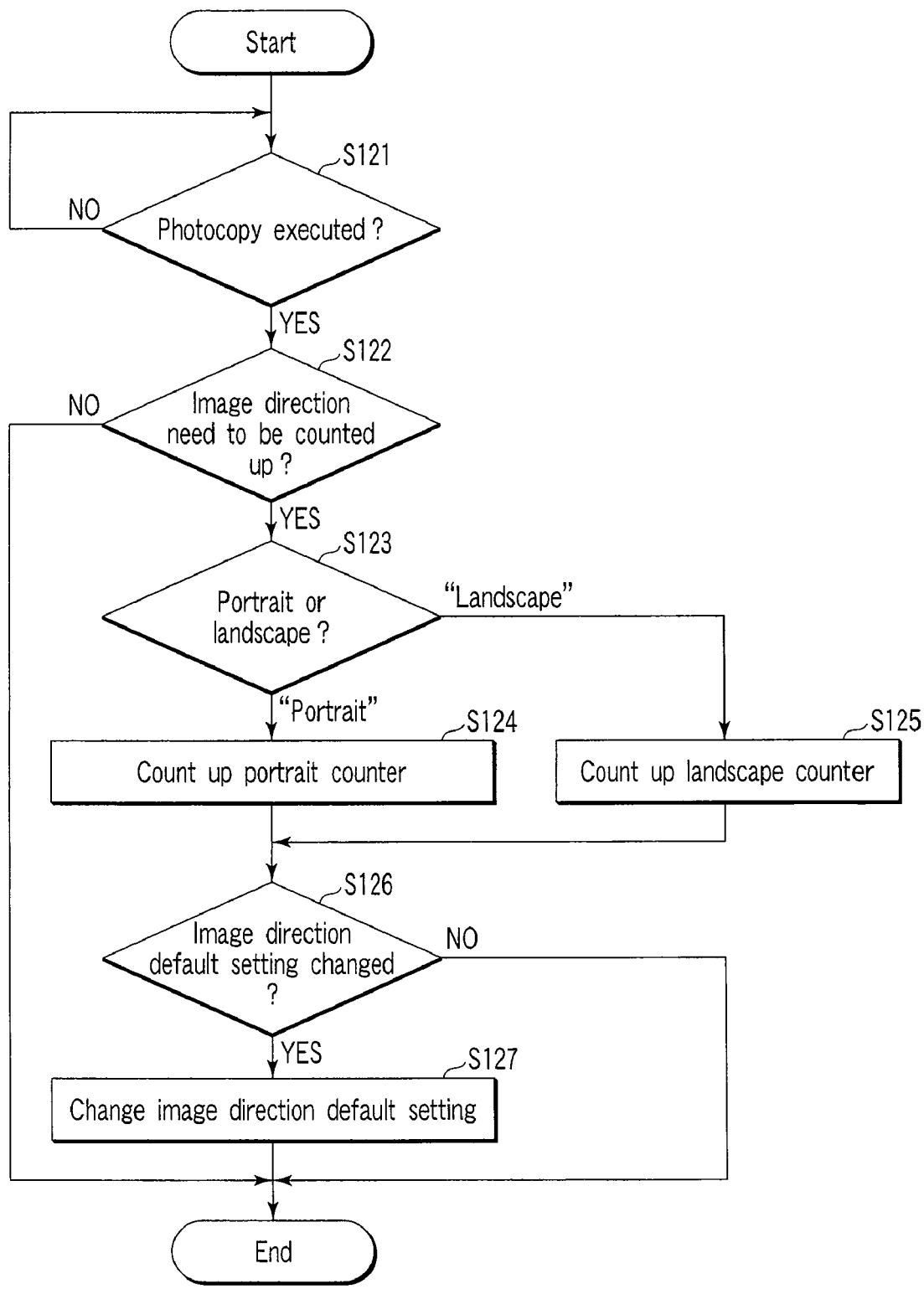
FIG. 14 is a flowchart showing processing to change an image direction default setting.

FIG. 14 is a flowchart showing processing to increase a setting frequency of the image direction default setting.

In a case where the start key 64 is input in a state in which the photocopier operates in a photocopy mode, the CPU 51 executes the photocopy processing based on the set contents (step S121, YES). To execute the photocopy processing, the CPU 51 judges whether or not it is necessary to count up the setting of the direction of the image in the draft of the photocopy processing (step S122). This judges whether or not the setting of the direction of the image in the draft should be counted up in the set contents of the photocopy processing. It is to be noted that a judgment reference of the step S122 may be similar to that of the step S68.

For example, in a case where the setting of the direction of the image in the draft does not influence the finish, that is, in the photocopy processing in which the finish does not change even if the direction of the image in the draft is that of the portrait or the landscape, it is judged that the image direction setting is not counted up.

Conversely, in a case where the direction of the image in the draft influences the finish, that is, in the photocopy processing in which the finish changes if the direction of the image in the draft is that of the portrait or the landscape, the CPU 51 judges that the image direction setting is counted up.

The step S122 may be judged by judging whether or not specific set contents are included in the set contents of the photocopy processing. For example, it is judged whether or not to count up the image direction setting in the set contents of the photocopy processing by judging whether or not, for example, the finishing setting, the Nin1 setting, the application setting or the like is set.

In a case where the judgment judges that the setting of the image direction in the photocopy processing is counted up (step S122, YES), the CPU 51 judges whether the image direction of the photocopy processing is set to the direction of the portrait or the landscape (step S123).

In a case where this judgment judges that the image direction in the photocopy processing is set to the portrait (step S123, "portrait"), the CPU 51 counts up the counter 54b for the portrait, disposed in the nonvolatile memory 54 (step S124).

Moreover, in a case where this judgment judges that the image direction in the photocopy processing is set to the landscape (step S123, "landscape"), the CPU 51 counts up the counter 54c for the landscape, disposed in the nonvolatile memory 54 (step S125).

When the counter 54b or 54c is counted up, the CPU 51 judges whether or not to change the default setting of the image direction based on count values of the counters 54b and 54c (step S126).

Here, it is judged whether or not to change the default setting by judging whether or not a difference between the count value of the counter 54b and the count value of the counter 54c is not less than a predetermined value.

For example, in a case where the present default setting stored in the default setting storage section 54a of the nonvolatile memory 54 is the portrait, the CPU 51 judges whether or not the default setting is to be changed to the landscape by judging whether or not a value is not less than a predetermined value, the value being obtained by subtracting the count value of the portrait counter 54b from that of the landscape counter 54c.

Conversely, in a case where the present default setting stored in the default setting storage section 54a of the nonvolatile memory 54 is the landscape, the CPU 51 judges whether or not the default setting is to be changed to the portrait by judging whether or not a value is not less than a predetermined value, the value being obtained by subtracting the count value of the landscape counter 54c from that of the portrait counter 54b.

In a case where the judgment judges that the image direction default setting is changed (step S126, YES), the CPU 51 rewrites the image direction default setting stored in the default setting storage section 54a of the nonvolatile memory 54 (step S127). It is to be noted that in a case where the image direction default setting is rewritten, it is assumed that the CPU 51 once clears the counters 54b and 54c.

For example, in a case where it is judged that the image direction default setting is changed to the landscape in a state in which the present default setting stored in the default setting storage section 54a of the nonvolatile memory 54 is the portrait, the CPU 51 rewrites the image direction default setting stored in the default setting storage section 54a into the landscape. In a case where it is judged that the image direction default setting is changed to the portrait in a state in which the present default setting stored in the default setting storage section 54a of the nonvolatile memory 54 is the landscape, the CPU 51 rewrites the image direction default setting stored in the default setting storage section 54a into the portrait.

In the above-described processing, every time the photocopy processing is executed, the image direction setting of each of the portrait and the landscape is counted up. The image direction default setting is changed based on the difference between the count value of the portrait and the count value of the landscape. In other words, the image direction as the default setting is set in accordance with the setting frequency of the image direction in the executed photocopy processing.

In consequence, the most frequently set image direction can be set as the default, and operability can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image forming apparatus comprising:
    a scanner which reads an image of a draft;
    a printer which prints the image on an image forming medium;
    a detection unit which detects a size and a setting direction of the draft set in the scanner;
    a display section which displays a plurality of icons to set a direction of the image in the draft and a setting direction of the draft set in the scanner;
    a display controller which displays, in a selectable state, the icons corresponding to the draft setting direction detected by the detection unit among the plurality of icons and which displays, in a non-selectable state, the icons that do not correspond to the draft setting direction detected by the detection unit among the plurality of icons; and
    a setting unit which sets the direction of the image in the draft to the image direction corresponding to the selected icon.

2. The image forming apparatus according to claim 1, wherein the display controller displays the icons which do not correspond to the draft setting direction detected by the detection unit to be thinner than the icons corresponding to the draft setting direction detected by the detection unit.

3. The image forming apparatus according to claim 1, further comprising:
    a memory to store a default setting of the direction of the image in the draft,
    wherein the display controller displays, in a selected state, the icon corresponding to the draft setting direction detected by the detection unit and corresponding to the image direction of the default setting stored in the memory.

4. The image forming apparatus according to claim 1, further comprising:
    a draft graphical image setting unit which sets a draft graphical image indicating set contents concerning the draft in set contents of photocopy processing every time the setting unit changes the set contents of the photocopy processing; and
    a finished graphical image setting unit which sets a finished graphical image indicating set contents concerning the image forming medium in the set contents of the photocopy processing every time the setting unit changes the set contents of the photocopy processing,
    wherein the display controller displays, together with the plurality of icons, the draft graphical image set by the draft graphical image setting unit and the finished graphical image set by the finished graphical image setting unit.

5. The image forming apparatus according to claim 4, wherein the draft graphical image setting unit sets the draft graphical image in which a graphical image indicating a draft setting is synthesized with a mark indicating an image direction corresponding to an icon brought into the selected state among the plurality of icons displayed in the display section, and
    the finished graphical image setting unit sets the finished graphical image in which a graphical image indicating a finish setting is synthesized with a mark indicating a direction of an image to be printed on the image forming medium in accordance with the direction of the image in the draft, corresponding to an icon brought into the selected state among the plurality of icons displayed in the display section.

6. The image forming apparatus according to claim 4, wherein the display section displays the plurality of icons as an image direction setting screen, and further displays the image direction setting screen in association with the draft graphical image by a graphical mark.

7. An image forming apparatus having: a scanner which reads an image of a draft; a printer which prints the image on an image forming medium; a detector which detects a size and a setting direction of the draft set in the scanner; and a display section which displays a setting screen concerning photocopy processing including a plurality of icons to set a direction of the image in the draft and a setting direction of the draft set in the scanner,
    the image forming apparatus comprising:
    detecting means for detecting the draft size and the draft setting direction based on a detection result of the detector;
    display means for displaying, in a selectable state, the icons corresponding to the draft setting direction detected by the detecting means among the plurality of icons, and displaying, in a non-selectable state, the icons which do not correspond to the draft setting direction detected by the detecting means among the plurality of icons; and
    setting means for setting the direction of the image in the draft as a photocopy processing setting to the image direction corresponding to the selected icon.

8. The image forming apparatus according to claim 7, wherein the display means displays the icons which do not correspond to the draft setting direction detected by the detecting means to be thinner than the icons corresponding to the draft setting direction detected by the detecting means.

9. The image forming apparatus according to claim 7, further comprising:
    a memory to store a default setting of the direction of the image in the draft,
    wherein the display means displays, in a selected state, the icon corresponding to the draft setting direction detected by the detecting means and corresponding to the image direction of the default setting stored in the memory.

10. The image forming apparatus according to claim 7, further comprising:
    draft graphical image setting means for setting a draft graphical image indicating set contents concerning the draft in set contents of photocopy processing every time the setting means changes the set contents of the photocopy processing; and
    finished graphical image setting means for setting a finished graphical image indicating set contents concerning the image forming medium in the set contents of the photocopy processing every time the setting means changes the set contents of the photocopy processing,
    wherein the display means displays, in the display section together with the plurality of icons to set the direction of the image in the draft, the draft graphical image set by the draft graphical image setting means and the finished graphical image set by the finished graphical image setting means.

11. The image forming apparatus according to claim 10, wherein the draft graphical image setting means sets the draft graphical image in which a graphical image indicating a draft setting is synthesized with a mark indicating an image direction corresponding to an icon brought into the selected state among the plurality of icons displayed in the display section, and the finished graphical image setting means sets the finished graphical image in which a graphical image indicating a finish setting is synthesized with a mark indicating a direction of an image to be printed on the image forming medium in accordance with the image direction corresponding to an icon brought into the selected state among the plurality of icons displayed In the display section.

12. The image forming apparatus according to claim 10, wherein the display means displays the plurality of icons as a setting screen of the direction of the image in the draft, and further displays the image direction setting screen in association with the draft graphical image by a graphical mark.

13. A method of setting an image forming apparatus having: a scanner which reads an image of a draft; a printer which prints the image on an image forming medium; a detector which detects a size and a setting direction of the draft set in the scanner; and a display section which displays a setting screen concerning photocopy processing including a plurality of icons to set a direction of the image in the draft and a setting direction of the draft set in the scanner, the method comprising:

detecting the draft size and the draft setting direction based on a detection result of the detector;

displaying, in a selectable state, the icons corresponding to the detected draft setting direction among the plurality of icons, and displaying, in a non-selectable state, the icons which do not correspond to the detected draft setting direction among the plurality of icons; and setting the direction of the image in the draft as a photocopy processing setting to the image direction corresponding to the selected icon.

14. The method of setting the image forming apparatus according to claim 13, wherein the displaying comprises:

displaying the icons which do not correspond to the detected draft setting direction to be thinner than the icons corresponding to the detected draft setting direction.

15. The method of setting the image forming apparatus according to claim 13, wherein the displaying comprises:

displaying, in a selected state, the icon corresponding to the detected draft setting direction and corresponding to the image direction of the default setting stored in a memory which stores a default setting of the direction of the image in the draft.

16. The method of setting the image forming apparatus according to claim 13, further comprising:

setting a draft graphical image indicating set contents concerning the draft in set contents of photocopy processing every time the set contents of the photocopy processing are changed; and setting a finished graphical image indicating set contents concerning the image forming medium in the set contents of the photocopy processing every time the set contents of the photocopy processing are changed, wherein the displaying comprises:

displaying, in the display section, the set draft graphical image and the set finished graphical image together with the plurality of icons to set the direction of the image in the draft.

17. The method of setting the image forming apparatus according to claim 16, wherein the setting of the draft graphical image comprises: setting the draft graphical image in which a graphical image indicating a draft setting is synthesized with a mark indicating an image direction corresponding to an icon brought into the selected state among the plurality of icons displayed in the display section, and the setting of the finished graphical image comprises: setting the finished graphical image in which a graphical image indicating a finish setting is synthesized with a mark indicating a direction of an image to be printed on the image forming medium in accordance with the image direction corresponding to an icon brought into the selected state among the plurality of icons displayed in the display section.

18. The method of setting the image forming apparatus according to claim 16, wherein the displaying comprises:

displaying the plurality of icons as a setting screen of the direction of the image in the draft; and further displaying the image direction setting screen in association with the draft graphical image by a graphical mark.

* * * * *